United States Patent
Ono et al.

(10) Patent No.: US 7,603,032 B2
(45) Date of Patent: Oct. 13, 2009

(54) IMAGE CAPTURING APPARATUS AND IMAGE CAPTURING METHOD THAT INSTRUCTS A USER TO CAPTURE AN IMAGE BEFORE AN IMAGE IS CAPTURED BASED ON A NECESSARY IMAGE TYPE

(75) Inventors: Shuji Ono, Kanagawa (JP); Kazuhiro Mino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 524 days.

(21) Appl. No.: 11/366,556

(22) Filed: Mar. 3, 2006

(65) Prior Publication Data

US 2006/0216017 A1 Sep. 28, 2006

(30) Foreign Application Priority Data

Mar. 3, 2005 (JP) .............................. 2005-059427
Jan. 12, 2006 (JP) .............................. 2006-005317

(51) Int. Cl.
*G03B 17/18* (2006.01)
*G06K 9/62* (2006.01)

(52) U.S. Cl. ...................... 396/287; 382/224; 348/231.2

(58) Field of Classification Search ............ 348/333.04, 348/231.99, 231.2, 231.3, 231.6; 382/224; 396/287

See application file for complete search history.

(56) References Cited

U.S. PATENT DOCUMENTS 6,148,106 A * 11/2000 Impagliazzo ................ 382/224
6,590,608 B2 * 7/2003 Matsumoto et al. ...... 348/231.2
7,483,060 B2 * 1/2009 Miyata ..................... 348/231.2
2005/0105803 A1 * 5/2005 Ray ........................... 382/209

FOREIGN PATENT DOCUMENTS

JP 2003-12532 A 4/2003

* cited by examiner

*Primary Examiner*—W B Perkey
*Assistant Examiner*—David M. Schindler
(74) *Attorney, Agent, or Firm*—Birch, Stewart, Kolasch & Birch, LLP

(57) ABSTRACT

The image capturing apparatus instructs a user to take an image of a type not stored among types of images necessary for making an album. The image capturing apparatus of the present invention includes: a necessary image type storing section that stores types of images necessary for making an album; a captured image storing section; a captured image type judging section that judges whether a type of image stored on the captured image storing section corresponds to either of the types of necessary images stored on the necessary image type storing section; a captured image type storing section that stores an image type judged by the captured image type judging section that the type corresponds to either of the necessary image types stored on the necessary image type storing section; an image type comparing section that compares the image type stored on the necessary image type storing section and the image type already stored on the captured image type storing section to judge a type of image not stored on the captured image type storing section; and an image capturing instructing section that instructs a user to take an image of the type not stored, which is judged by the image type comparing section.

14 Claims, 17 Drawing Sheets

FIG. 3

| NECESSARY IMAGE TYPE IDENTIFIER | IMAGE CAPTURING CONDITION | | | IMAGING MODE | CLASS OF SUBJECT | DIRECTION OF IMAGE | DIRECTIONAL COMPONENT OF IMAGE | VANISHING POINT DIRECTION |
|---|---|---|---|---|---|---|---|---|
| | FOCUSING DISTANCE | WHITE BALANCE | ...... | | | | | |
| 200 | — | — | ... | — | SCENERY | — | — | — |
| 202 | — | — | ... | PORTRAIT | FIGURE | — | — | — |
| 204 | — | SOLAR MODE | ... | — | A PLURALITY OF FIGURES | SIDEWAYS | — | — |
| 206 | — | — | ... | NIGHT SCENE | — | — | — | — |
| ... | ... | ... | ... | ... | ... | ... | ... | ... |

80

| FINAL IMAGE TYPE IDENTIFIER | IMAGE CAPTURING CONDITION | | | IMAGING MODE | CLASS OF SUBJECT | DIRECTION OF IMAGE | DIRECTIONAL COMPONENT OF IMAGE | VANISHING POINT DIRECTION |
|---|---|---|---|---|---|---|---|---|
| | FOCUSING DISTANCE | WHITE BALANCE | ...... | | | | | |
| 600 | — | SOLAR MODE | ... | CLOSE VIEW | A PLURALITY OF FIGURES | SIDEWAYS | — | — |
| 602 | — | SOLAR MODE | ... | DISTANT VIEW | A PLURALITY OF FIGURES | SIDEWAYS | RIGHT | — |
| 604 | — | — | ... | NIGHT SCENE | BUILDING | SIDEWAYS | — | — |
| 606 | — | FLUORESCENT LAMP MODE | ... | PORTRAIT | FIGURE | LENGTHWAYS | — | — |
| ... | ... | ... | ... | ... | ... | ... | ... | ... |

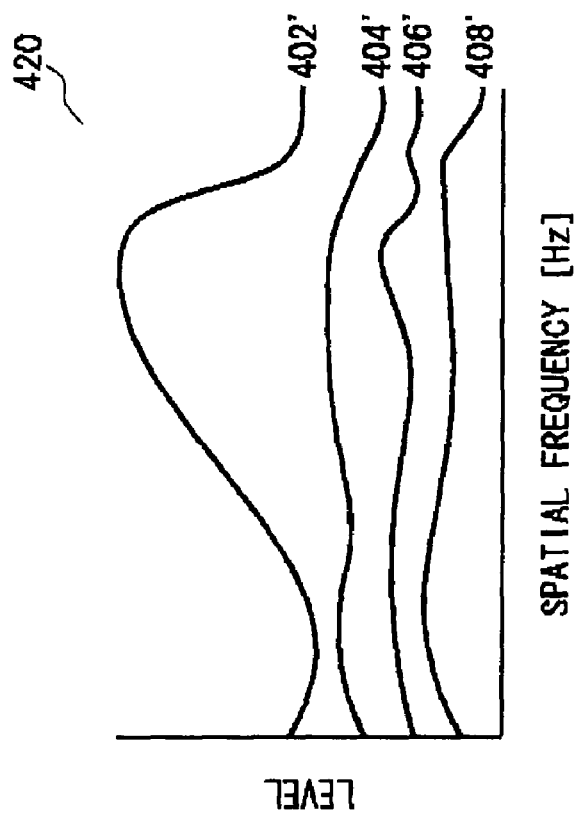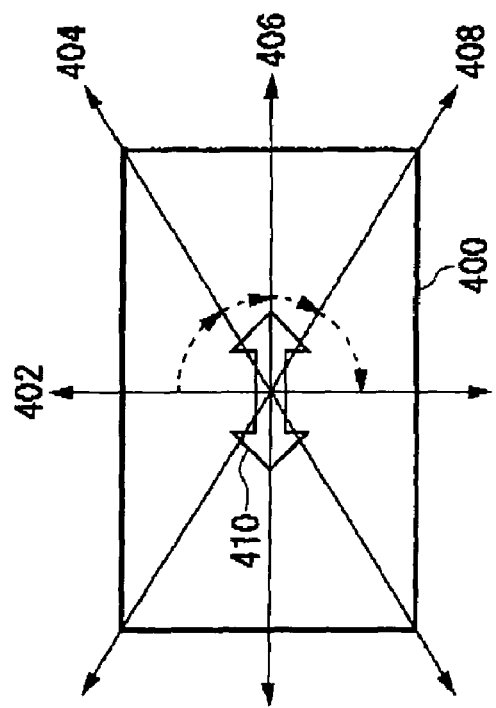
FIG. 5

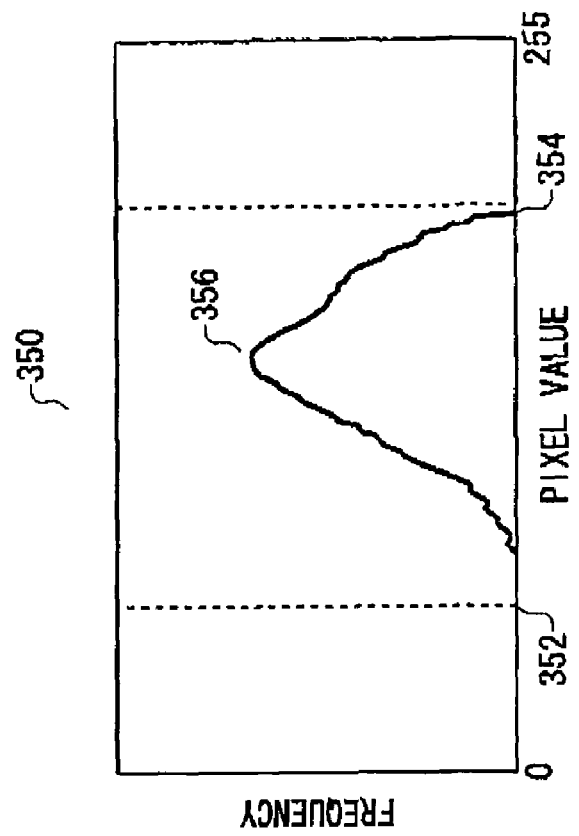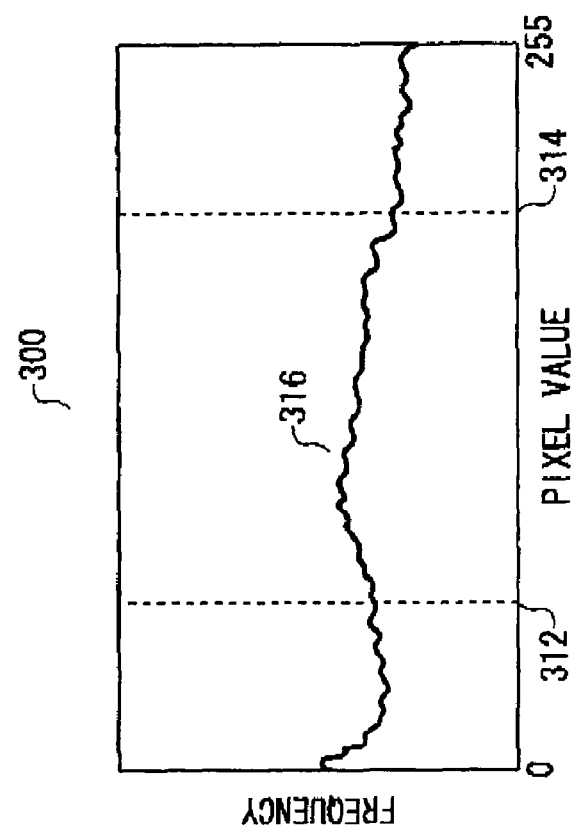
FIG. 13

__ US 7,603,032 B2 __

IMAGE CAPTURING APPARATUS AND IMAGE CAPTURING METHOD THAT INSTRUCTS A USER TO CAPTURE AN IMAGE BEFORE AN IMAGE IS CAPTURED BASED ON A NECESSARY IMAGE TYPE

CROSS REFERENCE TO THE RELATED APPLICATION

This patent application claims priority from Japanese Patent Application Nos. 2005-059427 filed on Mar. 3, 2005 and 2006-005317 filed on Jan. 12, 2006, the contents of which are incorporated herein by reference.

BACKGROUND OF THE INVENTION

1. Field of the Invention

The present invention relates to an image capturing apparatus, an image capturing method, and an image capturing program. More particularly, the present invention relates to an image capturing apparatus, an image capturing method, and an image capturing program informing a user of advice when taking an image to make an album.

2. Description of Related Art

Conventionally, a method, in which an image capturing apparatus instructs a user of a composition and a timing of photography and a user shoots the photos to make an album according to the instruction, is proposed as disclosed, for example, in Japanese Patent Application Publication 2003-125321.

However, only the generally same images can be captured even though a user is anyone when images are taken with a predetermined composition and timing. Therefore, there has been a problem that it is difficult to make an album by means of images reflecting personality of a user.

SUMMARY OF THE INVENTION

Therefore, it is an object of the present invention to provide an image capturing apparatus, an image capturing method, and an image capturing program that can solve the foregoing problems. The above and other objects can be achieved by combinations described in the independent claims. The dependent claims define further advantageous and exemplary combinations of the present invention.

To solve the problem, according to the first aspect of the present invention, there is provided an image capturing apparatus that takes an image. The image capturing apparatus includes: a necessary image type storing section that stores types of images necessary for making an album including a plurality of images; a captured image storing section that stores captured images; a captured image type judging section that judges whether a type of image stored on the captured image storing section corresponds to either of the types of necessary images stored on the necessary image type storing section; a captured image type storing section that stores an image type judged by the captured image type judging section in association with the image stored on the captured image storing section, the image type being judged by the captured image type judging section that the type corresponds to either of the necessary image types stored on the necessary image type storing section; an image type comparing section that compares the image type stored on the necessary image type storing section and the image type already stored on the captured image type storing section to judge a type of image that is stored on the necessary image type storing section but is not yet stored on the captured image type storing section; and an image capturing instructing section that previously instructs a user to take an image of the type not yet stored on the captured image type storing section, which is judged by the image type comparing section, before taking the image.

Moreover, the necessary image type storing section may store information showing that the taken image is an image taken using a predetermined image capturing condition, as an image type necessary for making an album, the captured image storing section may store an image capturing condition when the image has been taken, in association with the image, the captured image type judging section may judge whether the image stored on the captured image storing section is an image taken using the predetermined image capturing condition, the captured image type storing section may store information showing that the image is an image taken using the predetermined image capturing condition, which has been judged by the captured image type judging section, in association with the image stored on the captured image storing section, the image type comparing section may compare the predetermined image capturing condition stored on the necessary image type storing section and an image capturing condition already stored on the captured image type storing section to judge whether the image taken using the predetermined image capturing condition is already stored on the captured image type storing section, and the image capturing instructing section may instruct the user to take an image according to the predetermined image capturing condition when the image taken using the predetermined image capturing condition is not yet stored on the captured image type storing section.

Moreover, the necessary image type storing section may store information showing that the taken image is an image taken at a predetermined focusing distance, as an image type necessary for making an album, the captured image storing section may store a focusing distance when the image has been taken, in association with the image, the captured image type judging section may judge whether the image stored on the captured image storing section is an image taken at the predetermined focusing distance, the captured image type storing section may store information showing that the image is an image taken at the predetermined focusing distance, which has been judged by the captured image type judging section, in association with the image stored on the captured image storing section, the image type comparing section may compare the predetermined focusing distance stored on the necessary image type storing section and a focusing distance already stored on the captured image type storing section to judge whether the image taken at the predetermined focusing distance is already stored on the captured image type storing section, and the image capturing instructing section may instruct the user to take an image at the predetermined focusing distance when the image taken at the predetermined focusing distance is not yet stored on the captured image type storing section.

Moreover, the necessary image type storing section may store information showing that the taken image is an image taken in a predetermined image capturing mode, as an image type necessary for making an album, the captured image storing section may store an image capturing mode when the image has been taken, in association with the image, the captured image type judging section may judge whether the image stored on the captured image storing section is an image taken in the predetermined image capturing mode, the captured image type storing section may store information showing that the image is an image taken in the predetermined image capturing mode, which has been judged by the captured image type judging section, in association with the image stored on the captured image storing section, the image type comparing section may compare the predetermined image capturing mode stored on the necessary image type storing section and an image capturing mode already stored on the captured image type storing section to judge whether the image taken in the predetermined image capturing mode is already stored on the captured image type storing section, and the image capturing instructing section may instruct the user to take an image in the predetermined image capturing mode when the image taken in the predetermined image capturing mode is not yet stored on the captured image type storing section.

Further, the image capturing apparatus may further include a subject identifying section that judges a class of a subject of the image stored on the captured image storing section, the necessary image type storing section may store information showing that the taken image is an image in which a subject of a predetermined class has been taken, as an image type necessary for making an album, the captured image storing section may store a subject class of the image judged by the subject identifying section in association with the image, the captured image type judging section may judge whether the image stored on the captured image storing section is the image in which the subject of the predetermined class has been taken, the captured image type storing section may store information showing that the image is an image in which the subject of the predetermined class has been taken, which has been judged by the captured image type judging section, in association with the image stored on the captured image storing section, the image type comparing section may compare the subject of the predetermined class stored on the necessary image type storing section and a class of a subject already stored on the captured image type storing section to judge whether the image in which the subject of the predetermined class has been taken is already stored on the captured image type storing section, and the image capturing instructing section may instruct the user to take an image with the subject of the predetermined class when the image in which the subject of the predetermined class has been taken is not yet stored on the captured image type storing section. Moreover, the image capturing apparatus may further include a subject identifying section that judges the size of an area occupied in the image by a subject included in the image stored on the captured image storing section, the necessary image type storing section may store information showing that the taken image is an image in which a subject of a predetermined size has been taken, as an image type necessary for making an album, the captured image storing section may store the size of subject judged by the subject identifying section in association with the image, the captured image type judging section may judge whether the image stored on the captured image storing section is the image in which the subject of the predetermined size has been taken, the captured image type storing section may store information showing that the image is an image in which the subject of the predetermined size has been taken, which has been judged by the captured image type judging section, in association with the image stored on the captured image storing section, the image type comparing section may compare the subject with the predetermined size stored on the necessary image type storing section and the size of subject already stored on the captured image type storing section to judge whether the image in which the subject with the predetermined size has been taken is already stored on the captured image type storing section, and the image capturing instructing section may instruct the user to take an image with the subject of the predetermined size when the image in which the subject with the predetermined size has been taken is not yet stored on the captured image type storing section.

Moreover, the image capturing apparatus may further include a subject identifying section that judges a position in an image of a subject included in the image stored on the captured image storing section, the necessary image type storing section may store information showing that the taken image is an image in which a subject has been taken at a predetermined position, as an image type necessary for making an album, the captured image storing section may store the position of subject in the image judged by the subject identifying section in association with the image, the captured image type judging section may judge whether the image stored on the captured image storing section is the image in which the subject has been taken at the predetermined position, the captured image type storing section may store information showing that the image is an image in which the subject has been taken at the predetermined position, which has been judged by the captured image type judging section, in association with the image stored on the captured image storing section, the image type comparing section may compare the subject at the predetermined position in the image stored on the necessary image type storing section and a position of subject in the image already stored on the captured image type storing section to judge whether the image in which the subject is located at the predetermined position is already stored on the captured image type storing section, and the image capturing instructing section may instruct the user to take an image in which the subject is located at the predetermined position in the image when the image in which the subject has been taken at the predetermined position is not yet stored on the captured image type storing section. Further, the necessary image type storing section may store information showing that the taken image is an image with a predetermined direction, as an image type necessary for making an album, the captured image storing section may store a direction of the taken image in association with the image, the captured image type judging section may judge whether the image stored on the captured image storing section is an image with the predetermined direction, the captured image type storing section may store information showing that the image is an image with the predetermined direction, which has been judged by the captured image type judging section, in association with the image stored on the captured image storing section, the image type comparing section may compare the predetermined direction stored on the necessary image type storing section and a direction of the image already stored on the captured image type storing section to judge whether the image with the predetermined direction is already stored on the captured image type storing section, and the image capturing instructing section may instruct the user to take an image with the predetermined direction when the image with the predetermined direction is not yet stored on the captured image type storing section.

Moreover, the image capturing apparatus may further include an image direction component judging section that judges a direction component of the image stored on the captured image storing section, the necessary image type storing section may store information showing that the taken image is an image with a predetermined direction component, as an image type necessary for making an album, the captured image storing section may store a direction component of the image judged by the image direction component judging section in association with the image, the captured image type judging section may judge whether the image stored on the captured image storing section is an image with the predetermined direction component, the captured image type storing section may store information showing that the image is an image with the predetermined direction component, which has been judged by the captured image type judging section, in association with the image stored on the captured image storing section, the image type comparing section may compare the predetermined direction component stored on the necessary image type storing section and a direction component of the image already stored on the captured image type storing section to judge whether the image with the predetermined direction component is already stored on the captured image type storing section, and the image capturing instructing section may instruct the user to take an image with the predetermined direction component when the image with the predetermined direction component is not yet stored on the captured image type storing section.

Moreover, the necessary image type storing section may store information showing that a direction to a vanishing point of an object included in the image is a predetermined direction, as an image type necessary for making an album, the image direction component judging section may judge a direction to a vanishing point of an object included in the image stored on the captured image storing section, the captured image storing section may store the direction to the vanishing point judged by the image direction component judging section in association with the image, the captured image type judging section may judge whether the direction to the vanishing point of the object included in the image stored on the captured image storing section is the predetermined direction, the captured image type storing section may store information showing that the direction to the vanishing point of the object judged by the captured image type judging section in association with the image stored on the captured image storing section is the predetermined direction, the image type comparing section may compare the predetermined direction stored on the necessary image type storing section and a direction to a vanishing point of an object included in the image already stored on the captured image type storing section to judge whether the image in which the direction to the vanishing point of the object is the predetermined direction is already stored on the captured image type storing section, and the image capturing instructing section may instruct the user to take an image in which the direction to the vanishing point of the object is the predetermined direction when the image with the predetermined direction to the vanishing point of the object is not yet stored on the captured image type storing section.

Further, an album template may include an image arrangement frame in which an image is arranged and a character string arranged side-by-side in the image arrangement frame, the necessary image type storing section may store a character string arranged side-by-side in the image arrangement frame in which the image is arranged, in association with an image type necessary for making an album, and the image capturing instructing section may inform the user of the character string stored on the necessary image type storing section in association with the type when instructing the user to take an image of the type not yet stored on the captured image type storing section. Moreover, the image capturing apparatus may further include: an image capturing condition storing section that stores an image capturing condition when an image of the type stored on the necessary image type storing section is taken, in association with an image type necessary for making an album; and an image capturing condition setting section that sets the image capturing condition stored on the image capturing condition storing section in association with the type of image instructed by the image capturing instructing section when the image capturing instructing section instructs the user to take the image.

Moreover, according to the second aspect of the present invention, there is provided an image capturing method of capturing an image. The image capturing method includes: a necessary image type storing step of storing types of images necessary for making an album including a plurality of images; a captured image storing step of storing captured images; a captured image type judging step of judging whether a type of image stored in the captured image storing step corresponds to either of the types of necessary images stored in the necessary image type storing step; a captured image type storing step of storing an image type judged in the captured image type judging step in association with the image stored in the captured image storing step, the image type being judged in the captured image type judging step that the type corresponds to either of the necessary image types stored in the necessary image type storing step; an image type comparing step of comparing the image type stored in the necessary image type storing step and the image type already stored in the captured image type storing step to judge a type of image that is stored in the necessary image type storing step but is not yet stored in the captured image type storing step; and an image capturing instructing step of previously instructing a user to take an image of the type not yet stored in the captured image type storing step, which is judged in the image type comparing step, before taking the image.

Moreover, according to the third aspect of the present invention, there is provided an image capturing program for an image capturing apparatus that previously instructs a user to take an image before taking the image. The program makes the image capturing apparatus function as: a necessary image type storing section that stores types of images necessary for making an album including a plurality of images; a captured image storing section that stores captured images; a captured image type judging section that judges whether a type of image stored on the captured image storing section corresponds to either of the types or necessary images stored on the necessary image type storing section; a captured image type storing section that stores an image type judged by the captured image type judging section in association with the image stored on the captured image storing section, the image type being judged by the captured image type judging section that the type corresponds to either of the necessary image types stored on the necessary image type storing section; an image type comparing section that compares the image type stored on the necessary image type storing section and the image type already stored on the captured image type storing section to judge a type of image that is stored on the necessary image type storing section but is not yet stored on the captured image type storing section; and an image capturing instructing section that previously instructs a user to take an image of the type not yet stored on the captured image type storing section, which is judged by the image type comparing section, before taking the image.

Moreover, according to the fourth aspect of the present invention, there is provided an image capturing apparatus. The image capturing apparatus includes: an image capturing section that receives light of an image capturing area to acquire a captured image; an object specifying section that specifies an object included in the captured image acquired from the image capturing section; a posterization image generating section that generates a posterization image of the object specified by the object specifying section; a displaying section that displays the posterization image generated from the posterization image generating section; an imaging instruction inputting section that makes a user input an instruction of an imaging operation when the displaying section displays the posterization image; and a captured image recording section that records the captured image acquired from the image capturing section when the instruction from the user is input into the imaging instruction inputting section. Further, the image capturing apparatus may further include: a histogram distribution computing section that computes a histogram distribution of an object area included in the captured image specified by the object specifying section; and an image capturing instructing section that instructs the user to take a captured image for a posterization image when the histogram distribution computed from the histogram distribution computing section exceeds a predetermined range.

Moreover, according to the fifth aspect of the present invention, there is provided an image capturing method of capturing a captured image for a posterization image. The image capturing method includes: an object specifying step of specifying an object included in a captured image acquired from an image capturing section by receiving light of an image capturing area; a posterization image generating step of generating a posterization image of the object specified in the object specifying step; a displaying step of displaying the posterization image generated in the posterization image generating step; an imaging instruction inputting step of making a user input an instruction of an imaging operation when the posterization image is displayed in the displaying step; and a captured image recording step of recording the captured image acquired from the image capturing section when the instruction from the user is input in the imaging instruction inputting step.

Moreover, according to the sixth aspect of the present invention, there is provided an image capturing program for an image capturing apparatus that takes a captured image for a posterization image. The program makes the image capturing apparatus function as: an image capturing section that receives light of an image capturing area to acquire a captured image; an object specifying section that specifies an object included in the captured image acquired from the image capturing section; a posterization image generating section that generates a posterization image of the object specified by the object specifying section; a displaying section that displays the posterization image generated from the posterization image generating section; an imaging instruction inputting section that makes a user input an instruction of an imaging operation when the displaying section displays the posterization image; and a captured image recording section that records the captured image acquired from the image capturing section when the instruction from the user is input into the imaging instruction inputting section.

Moreover, according to the seventh aspect of the present invention, there is provided an image capturing apparatus. The apparatus includes: an image capturing section that receives light of an image capturing area to acquire a captured image; a main subject specifying section that specifies a main subject included in the captured image acquired from the image capturing section; a trimming section that trims off the main subject specified by the main subject specifying section from the captured image to generate a trimming image; a displaying section that displays the trimming image generated from the trimming section; an imaging instruction inputting section that makes a user input an instruction of an imaging operation when the displaying section displays the trimming image; and a captured image recording section that records the captured image acquired from the image capturing section when the instruction from the user is input into the imaging instruction inputting section. Further, the main subject specifying section may include: a distance information acquiring section that acquires main subject distance information that is information indicative of a distance between the image capturing apparatus and the main subject for each of a plurality of partial areas in the captured image acquired from the image capturing section; and a boundary specifying section that specifies a boundary of the main subject in the captured image taken by the image capturing section based on the main subject distance information acquired from the distance information acquiring section, and the trimming section may trim off the main subject from the captured image by means of the boundary specified by the boundary specifying section.

Moreover, according to the eighth aspect of the present invention, there is provided an image capturing method of capturing an image for a trimming image. The image capturing method includes: a main subject specifying step of specifying a main subject included in a captured image acquired from an image capturing section by receiving light of an image capturing area; a trimming step of trimming off the main subject specified in the main subject specifying step from the captured image to generate a trimming image; a displaying step of displaying the trimming image generated in the trimming step by a displaying section; an imaging instruction inputting step of making a user input an instruction of an imaging operation when the displaying section displays the trimming image; and a captured image recording step of recording the captured image acquired from the image capturing section when the instruction from the user is input in the imaging instruction inputting step.

Moreover, according to the ninth aspect of the present invention, there is provided an image capturing program for an image capturing apparatus. The program makes the image capturing apparatus function as: an image capturing section that receives light of an image capturing area to acquire a captured image; a main subject specifying section that specifies a main subject included in the captured image acquired from the image capturing section; a trimming section that trims off the main subject specified by the main subject specifying section from the captured image to generate a trimming image; a displaying section that displays the trimming image generated from the trimming section; an imaging instruction inputting section that makes a user input an instruction of an imaging operation when the displaying section displays the trimming image; and a captured image recording section that records the captured image acquired from the image capturing section when the instruction from the user is input into the imaging instruction inputting section.

The summary of the invention does not necessarily describe all necessary features of the present invention. The present invention may also be a sub-combination of the features described above.

According to the present invention, it is possible to previously instruct a user to take an image of a type not yet stored among types of images necessary for making an album before taking the image to take the image.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which:

FIG. 3 is a view showing a necessary image type storing section;

FIG. 4 is a view showing a captured image type storing section;

FIG. 5 is a view showing a method of computing a direction component of an image by an image direction component judging section;

FIG. 13 is a view showing a process of a histogram distribution computing section and an image capturing instructing section;

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
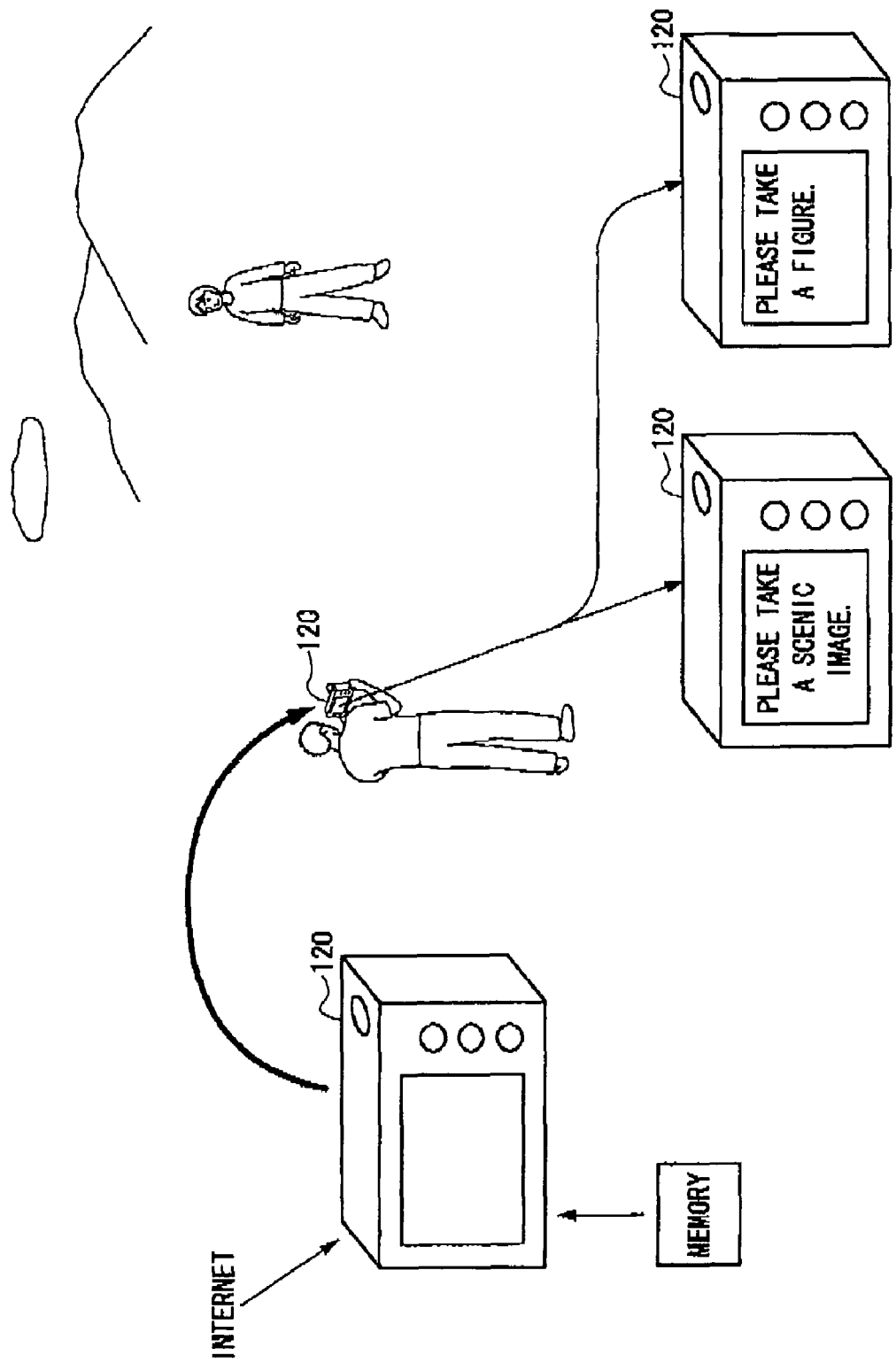
FIG. 1 is a conceptual diagram showing an image capturing apparatus.

FIG. 1 shows a conceptual diagram of an image capturing apparatus 120 according to an embodiment of the present invention. For example, when making an album using an album making system, a user selects an album to be made every event such as an athletic meet, a trip, a banquet. Then, when the user selects an album, an album template is selected for each album that the user wants to make. Here, an album template means a template in which a frame to attach an image in an album is previously determined and for which an image of the type to be attached to each frame is determined. Further, an image type means a type of images to be included in an album template such as a scenic image, an image including a figure, an image of which an image capturing mode is a night scene mode.

The image capturing apparatus 120 receives an image type necessary for an album that the user wants to make from an album making system through a communication network such as Internet or a memory. Then, the image capturing apparatus 120 instructs the user to take an image of the received type. The image capturing apparatus 120 supplies a taken image to the album making system via the Internet or the memory after the user takes the image of the instructed type. The image supplied to the album making system is synthesized in the album template to make an album.

The image capturing apparatus 120 may be, e.g., a digital camera, or may be a portable telephone, PDA, or the like with a digital camera. Moreover, Internet may be a network such as LAN. Further, a memory may be a recording medium using a magnetic storage medium and a semiconductor storage medium. In addition, the image capturing apparatus 120 may store an image type necessary for an album template by means of radio communication and optical communication in addition to a memory and Internet.

The image capturing apparatus 120 according to the present embodiment previously instructs the user to take an image of the type not yet taken among image types necessary for making the album before taking the image, and makes the user take the image.

Figure 2:
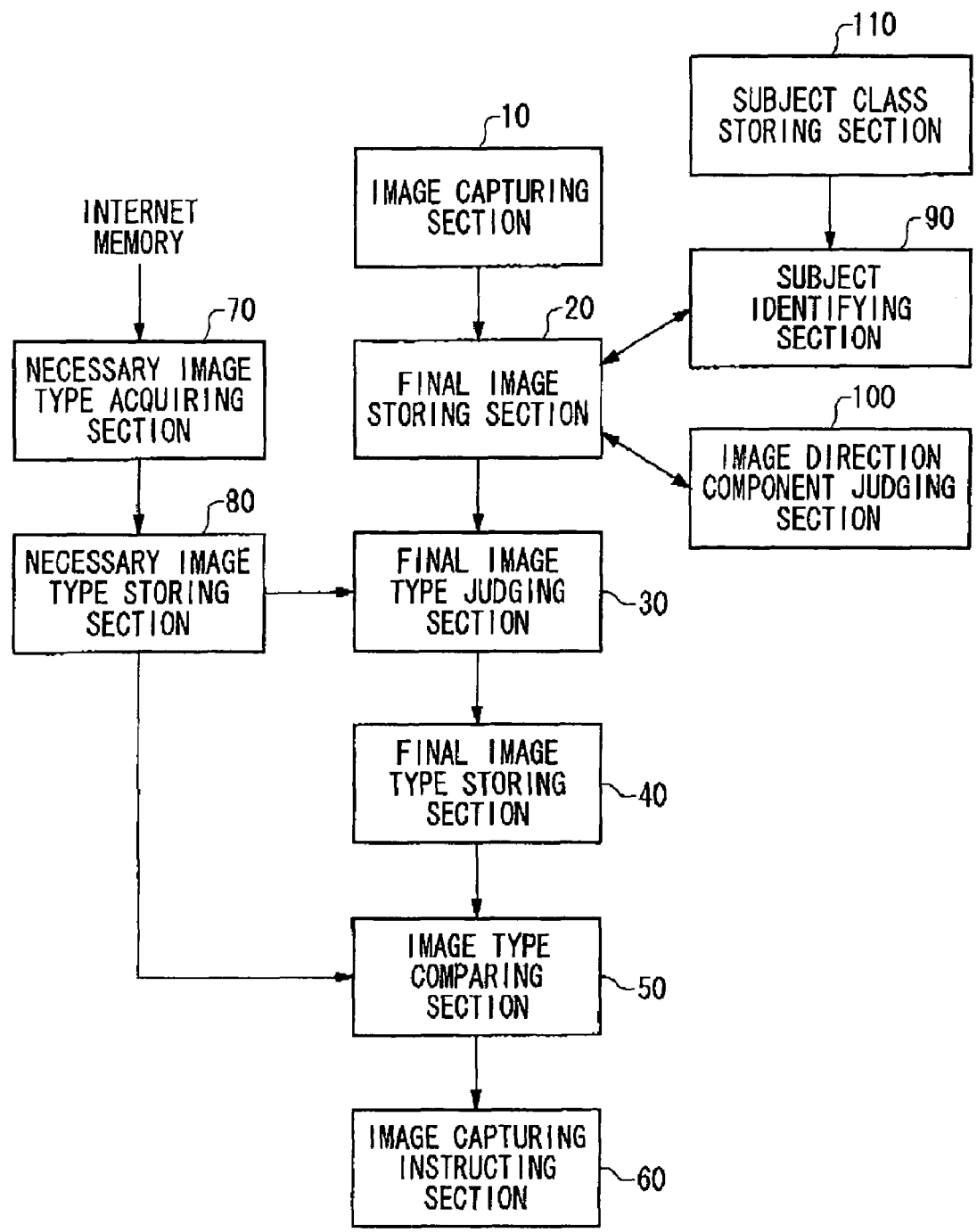
FIG. 2 is a block diagram showing a functional configuration of an image capturing apparatus.

FIG. 2 is a view exemplary showing a functional configuration of the image capturing apparatus 120 according to the present embodiment. The image capturing apparatus 120 includes an image capturing section 10, a captured image storing section 20, a captured image type judging section 30, a captured image type storing section 40, an image type comparing section 50, an image capturing instructing section 60, a necessary image type acquiring section 70, a necessary image type storing section 80, a subject identifying section 90, an image direction component judging section 100, and a subject class storing section 110. The captured image storing section 20 stores an image taken by the image capturing section 10.

The captured image storing section 20 stores the captured image in association with an image identifier which can uniquely be identified for the taken image. Then, the captured image storing section 20 supplies the captured image to the subject identifying section 90, the image direction component judging section 100, and the captured image type judging section 30. The subject class storing section 110 stores a template image that is an image of a subject of the class in association with a class of the subject. Then, the subject class storing section 110 supplies the stored template image for the subject to the subject identifying section 90. In addition, the template image for the subject may be a template image such as a figure, an automobile, or a building.

Then, the subject identifying section 90 judges a class of a subject of the image stored on the captured image storing section 20. The subject identifying section 90 supplies the class of the subject of the image judged by the subject identifying section 90 to the captured image storing section 20. Here, the subject identifying section 90 extracts a subject from the captured image by means of an image processing such as an outline extracting process or a color distribution analyzing process. Then, a class of a subject may be judged by matching the extracted subject with a typical image of a subject class stored on the subject class storing section 110. Moreover, the subject identifying section 90 may judge a subject extracted by flesh color extraction as a figure when the subject is a figure.

Further, the subject identifying section 90 may judge the size of an area occupied by a subject in a subject image included in the image stored on the captured image storing section 20 and a position of the subject in the image. Moreover, the image direction component judging section 100 judges a direction component of the image stored on the captured image storing section 20. The image direction component judging section 100 supplies the direction component of the image judged by the image direction component judging section 100 to the captured image storing section 20.

The captured image storing section 20 stores the class of the subject of the image, the size of the subject in the image, and the position of the subject in the image that are judged by the subject identifying section 90 and the direction component of the image judged by the image direction component judging section 100, and supplies them to the captured image type judging section 30. Moreover, the necessary image type acquiring section 70 receives an image type necessary for making an album from Internet and a memory. The necessary image type acquiring section 70 supplies the acquired image type to the necessary image type storing section 80. The necessary image type storing section 30 stores the image type necessary for making an album.

Then, the necessary image type storing section 80 supplies the image type necessary for making an album to the captured image type judging section 30 and the image type comparing section 50. The captured image type judging section 30 receives the captured image, the subject class of the image judged by the subject identifying section 90, and the direction component of the image judged by the image direction component judging section 100, from the captured image storing section 20. Furthermore, the captured image type judging section 30 receives the image type necessary for making an album from the necessary image type storing section 80.

The captured image type judging section 30 judges whether the image type stored on the captured image storing section 20 corresponds to either of necessary image types stored on the necessary image type storing section 80. The captured image type judging section 30 supplies the image type judged to correspond to either of necessary image types stored on the necessary image type storing section 80 to the captured image type storing section 40. The captured image type storing section 40 stores the image type judged to correspond to either of necessary image types stored on the necessary image type storing section 80.

Then, the image type comparing section 50 receives the image type stored on the captured image type storing section 40 from the captured image type storing section 40. Moreover, the image type comparing section 50 receives the image type stored on the necessary image type storing section 80 from the necessary image type storing section 80. Then, the image type comparing section 50 compares the image type received from the captured image type storing section 40 and the image type received from the necessary image type storing section 80.

Then, the image type comparing section 50 judges a type of an image that is stored on the necessary image type storing section 80 but is not yet stored on the captured image type storing section 40. The image type comparing section 50 supplies the image type not yet stored on the captured image type storing section 40 to the image capturing instructing section 60. Then, the image capturing instructing section 60 previously instructs a user to take an image of the type that is not yet stored on the captured image type storing section 40 before taking an image.

The instruction to the user by the image capturing instructing section 60 is displayed on, e.g., a displaying section included in the image capturing apparatus 120. Moreover, the image capturing instructing section 60 may instruct the user to take an image by means of a voice.

According to the image capturing apparatus 120 of the present embodiment, it is possible to instruct the user to take an image of the type not yet taken among image types necessary for making an album. In this way, the user can precisely take an image of the type necessary for making an album, and make the album according to an album template. Moreover, since the user can freely determine a timing of an image capturing and a composition on the occasion of the image capturing, it is possible to make the album in which personality of the user is reflected.

FIG. 3 is a view exemplary showing the necessary image type storing section 80 in the present embodiment. The necessary image type storing section 80 stores the type of an image necessary for making an album in association with a necessary image type identifier. The album is an album tailored to various events such as an album for an athletic meet, an album for a trip, and an album for a banquet. Moreover, the type of an image necessary for making an album may be an image to be taken on a predetermined image capturing condition. For example, the image capturing condition is a condition such as a focusing distance, white balance, and a presence or absence of a flash. For example, when an image capturing condition is a focusing distance, the necessary image type storing section 80 stores the type of image in which the focusing distance is 10 cm in association with a necessary image type identifier. Moreover, information showing that the image is an image taken in a predetermined image capturing mode may be the type of image necessary for making an album. For example, the necessary image type is information showing that the image is an image taken in a distant view mode, a close view mode, a portrait mode, and a night scene mode. Moreover, information showing that the image is an image, in which a predetermined class of a subject is taken, may be the type of image necessary for making an album. For example, the necessary image type is information indicative of scenery, a figure, a building, and so on. Further, when the necessary image type is a figure, single figure or multiple figures may be the type of image necessary for making an album according to the number of figures.

Further, the necessary image type storing section 80 may store the size of the subject in the image and the position of the subject in the image as the type of image necessary for making an album. Specifically, the necessary image type storing section 80 may store information showing that the size of the subject in the image is more than a predetermined size, as the necessary image type. Since the necessary image type storing section 80 previously stores the size of the subject in the image as the necessary image type, the image capturing instructing section 60 allows the user to take a subject with the predetermined size. Thus, it is possible to easily make an album in which the size of a plurality of subjects in the image is a generally constant size. Moreover, the necessary image type storing section 80 may store, as the necessary image type, information showing that the position of the subject in the image is generally middle and information showing that the subject is not included in any space of top, bottom, right, and left in the image. In this way, the image capturing instructing section 60, which receives the necessary image type stored on the necessary image type storing section 80 via the image type comparing section 50, can instruct the user to take an image in which the subject has a predetermined size and is located at a predetermined position. Therefore, because the image capturing apparatus 120 can instruct the user to take a predetermined image during taking an image, it is possible to make the user take an intentional image in regard to a composition of images and omit an image processing such as trimming and scaling after taking an image.

Moreover, a type of an image necessary for making an album may be information showing that it is an image of a predetermined direction. For example, a necessary image type is information showing that a direction of an image is a longitudinal direction or a horizontal direction. Furthermore, a type of an image necessary for making an album may be information showing that an image has a predetermined direction component or information showing that a direction toward a vanishing point of an object included in an image is a predetermined direction. Furthermore, the necessary image type storing section 80 may store a panorama image as a type of an image necessary for making an album.

The necessary image type storing section 80 can freely combine necessary image types explained above to store a type of an image necessary for making an album. For example, the necessary image type identifier 200 specifies scenery as a class of a subject to use it as a necessary image type. Moreover, the necessary image type identifier 202 uses an image, in which an image capturing mode is a portrait mode and a class of a subject is a figure, as a necessary image type. Moreover, the necessary image type identifier 204 may use an image, in which white balance is a solar mode, a class of a subject is a plurality of figures, and a direction of the image is transverse, as a necessary image type.

FIG. 4 is a view exemplary showing the captured image type storing section 40 according to the present embodiment. The captured image type storing section 40 stores a type of image judged by the captured image type judging section 30 to correspond to either of the necessary image types stored on the necessary image type storing section 80. For example, it is considered that the type of an image, in which an image capturing mode is a close view mode, has been stored on the necessary image type storing section 80 as a necessary image type. In this case, when an image taken in a close view mode has been stored on the captured image storing section 20, the captured image type judging section 30 may store the type of image taken in a close view mode on the captured image type storing section 40 in association with a captured image type identifier 600.

Moreover, for example, it is considered that the type of image, in which a class of subject is a building, has been stored on the necessary image type storing section 80 as a necessary image type. In this case, when an image including a building has been stored on the captured image storing section 20, the captured image type judging section 30 may store the type of image including the taken building on the captured image type storing section 40 in association with a captured image type identifier 604. In addition, when storing a type of an image on the captured image type storing section 40, the taken image may be stored on the captured image type storing section 40 even when a part of the types of image are identical with each other between the types of image stored on the necessary image type storing section 80 in association with the necessary image type identifier and the types of taken image, in addition to when both are completely identical with each other.

FIG. 5 is a view exemplary showing a method of computing a direction component of an image by the image direction component judging section 100 according to the present embodiment. For example, the image direction component judging section 100 computes a level of a spatial frequency component along a plurality of directions passing predetermined one point included a captured image 400. The image direction component judging section 100 may specify a direction perpendicular to a direction 402 corresponding to a curved line 402' having a spatial frequency component of the highest level as a direction component 410 of the captured image 400, as shown in a graph 420 showing a level of a spatial frequency in each direction.

Figure 6:
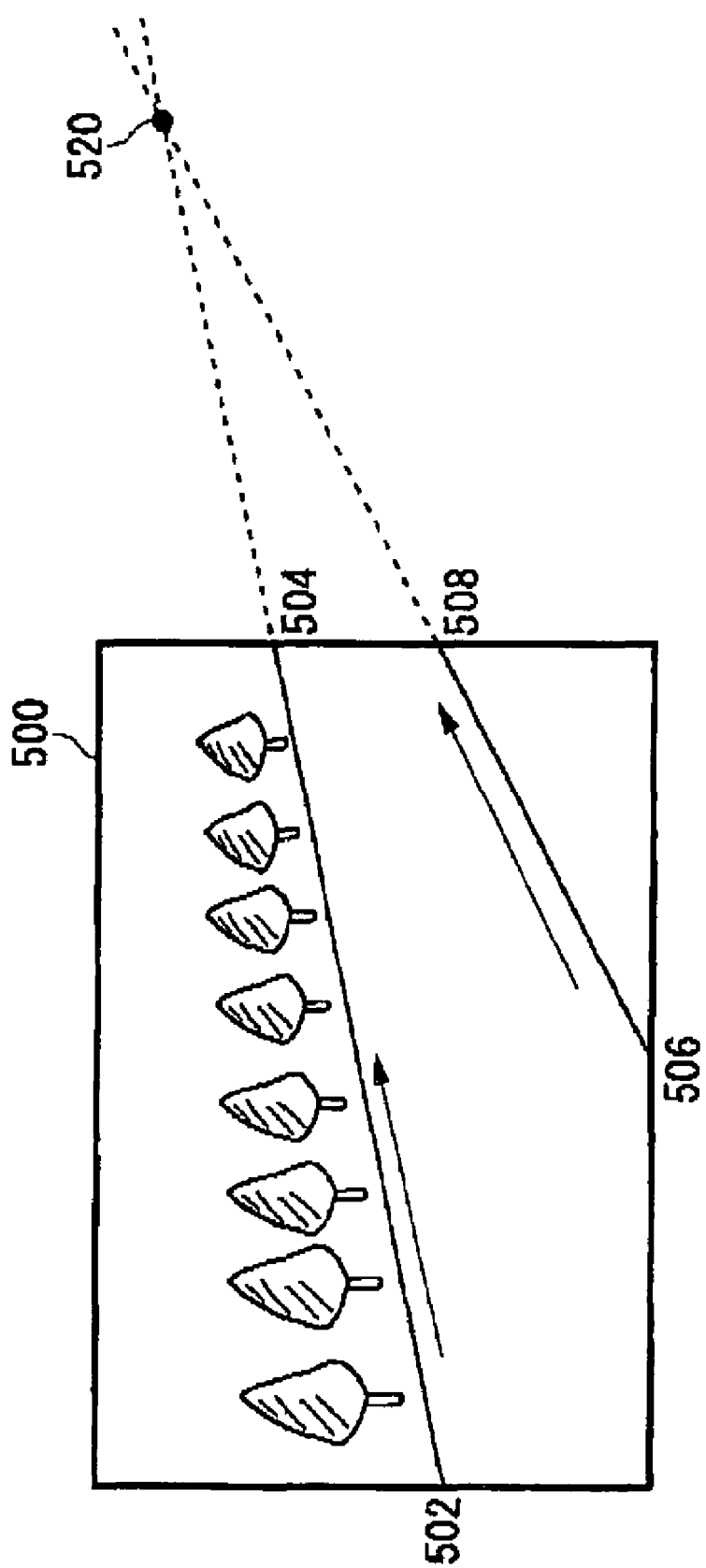
FIG. 6 is a view showing a method of computing a vanishing point direction of an object by an image direction component judging section.

FIG. 6 is a view exemplary showing a method of computing a vanishing point direction of an object by the image direction component judging section 100 according to the present embodiment. The image direction component judging section 100 may extract a segment element from an image and then compute an intersection of intersecting straight line group as a vanishing point by means of Hough transform. For example, an intersection of an extended line of the straight line linking an edge of a road 502 and an edge of a road 504 included in the captured image 500 between an extended line of the straight line linking an edge of a road 506 and an edge of a road 508 can be used as a vanishing point 520. Then, the image direction component judging section 100 may specify a direction facing the computed vanishing point as a direction component of an image.

Figure 7:
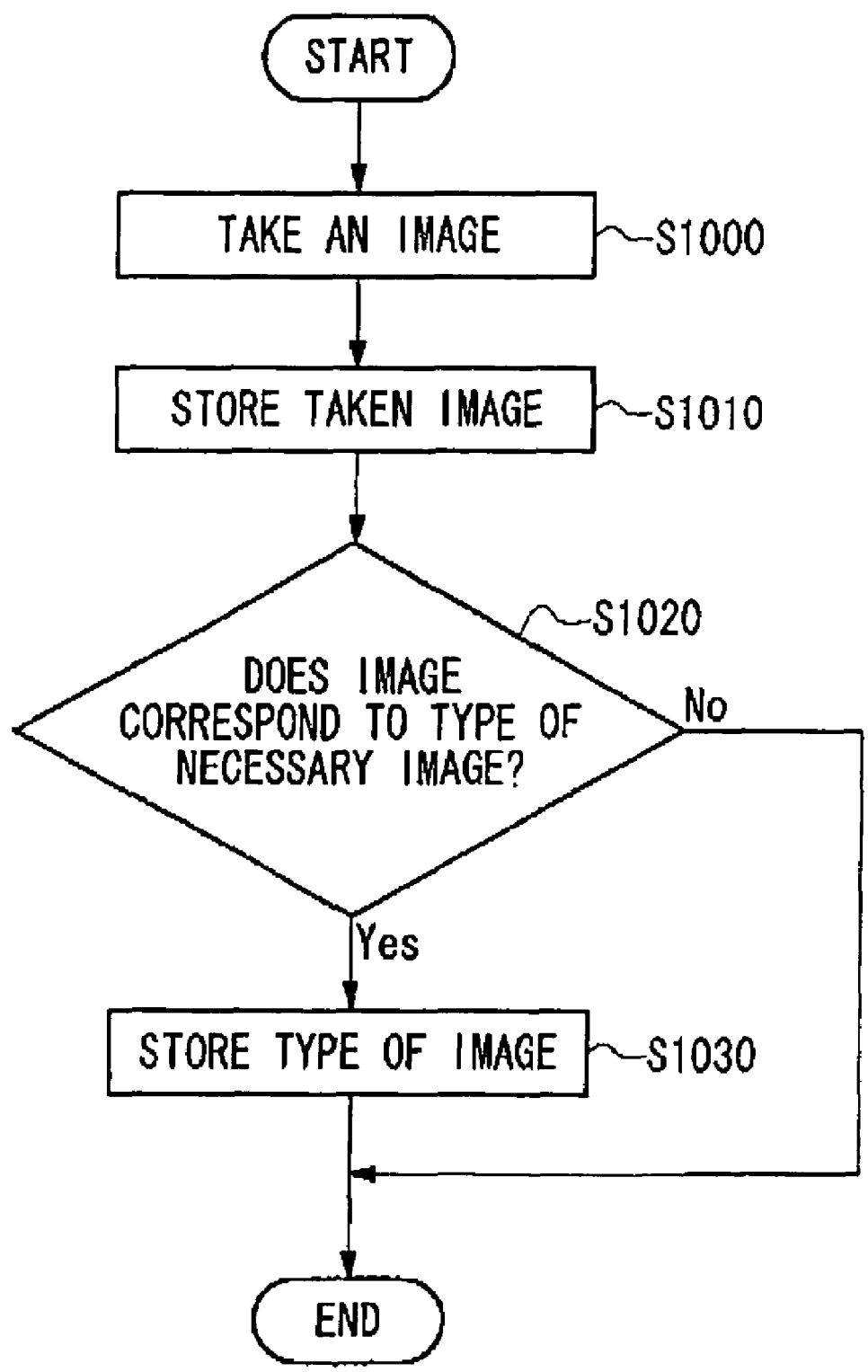
FIG. 7 is a flowchart showing a flow of a process in an image capturing apparatus.

FIG. 7 is a view exemplary showing a flow of a process in the image capturing apparatus 120 according to the present embodiment. At first, the image capturing section 10 takes an image (S1000). Subsequently, the captured image storing section 20 stores the taken image (S1010). Subsequently, the captured image type judging section 30 judges whether the type of the taken image corresponds to a type of an image necessary for making an album (S1020). Then, when the captured image type judging section 30 has judged that the type of the taken image corresponds to either of necessary image types stored on the necessary image type storing section 80 (S1020:Yes), the captured image type storing section 40 stores the necessary image type (S1030).

For example, the judgment of an image type by the captured image type judging section 30 is to select the image type for which the type of image stored on the necessary image type storing section 80 in association with the necessary image type identifier and the type of the taken image are completely identical with each other. Moreover, there may be selected the image type for which a part of the type of image stored on the necessary image type storing section 80 in association with the necessary image type identifier and a part of the type of the taken image are identical with each other.

For example, it is considered that the image type in which an image capturing mode is a portrait mode and a class of the subject is a figure is stored on the necessary image type storing section 80 in association with the necessary image type identifier. In this case, the captured image type judging section 30 may judge that the type of image in which an image capturing mode of the taken image is a portrait mode corresponds to a necessary image type. Moreover, the captured image type judging section 30 may judge that the type of image in which an image capturing mode of the taken image is a portrait mode and a class of the subject is a figure corresponds to a necessary image type.

Figure 8:
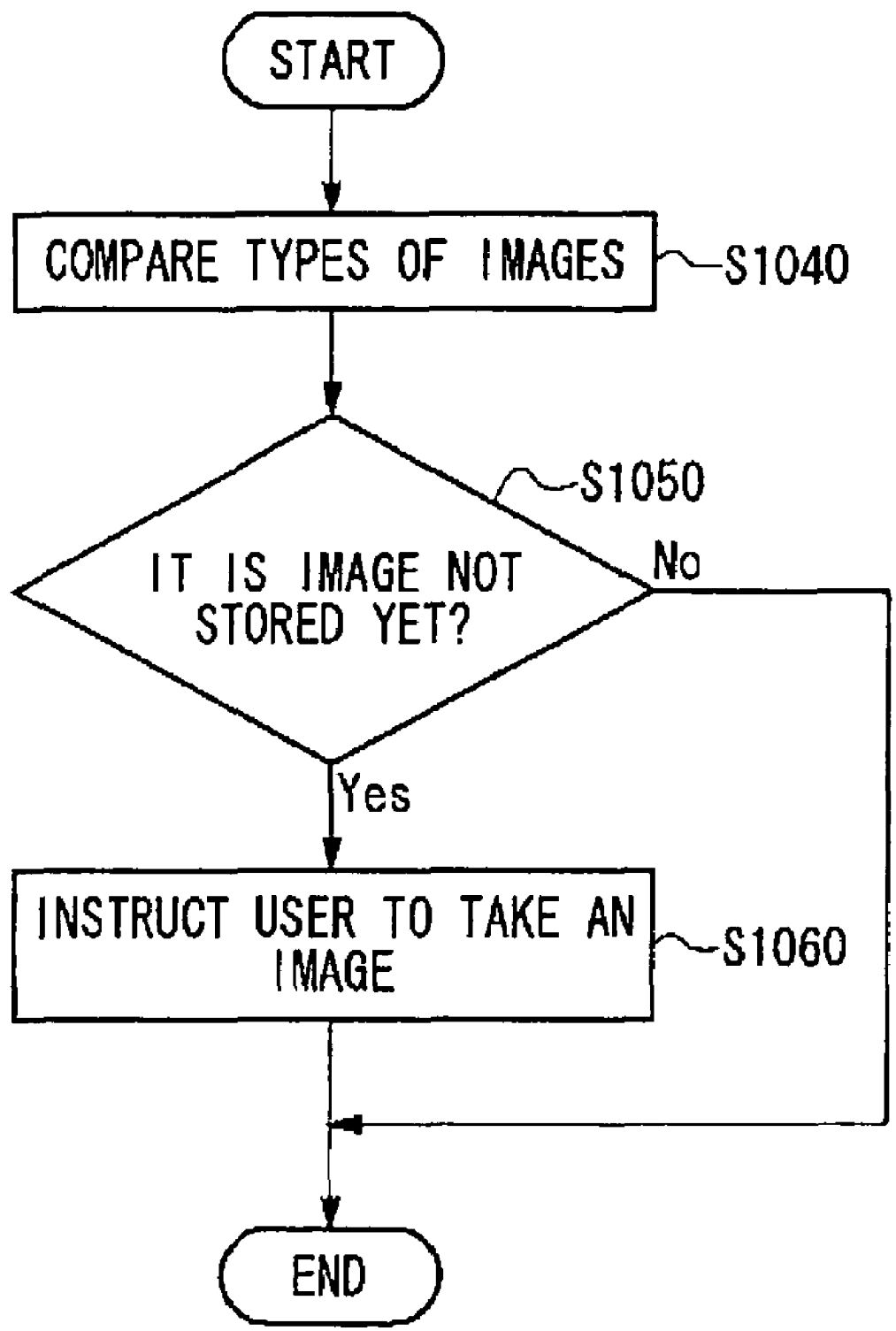
FIG. 8 is a flowchart showing a flow of a process in an image capturing apparatus.

FIG. 8 is a view exemplary showing a flow of a process in the image capturing apparatus 120 according to the present embodiment. At first, the image type comparing section 50 compares the type of image stored on the captured image type storing section 40 with the type of image stored on the necessary image type storing section 80 (S1040). Subsequently, the image type comparing section 50 judges whether a type of an image to be stored on the captured image type storing section 40 is a type of an image that is stored on the necessary image type storing section 80 but is not yet stored on the captured image type storing section 40 (S1050). Then, when there is the type of image not yet stored on the captured image type storing section 40 (S1050: Yes), the image capturing instructing section 60 instructs the user to take an image of the image type not yet stored (S1060). Subsequently, the image is taken by the image capturing section 10 (FIG. 7: S1000).

According to the present embodiment, the image capturing apparatus 120 can instruct the user to take an image of a necessary type when there is not taken an image corresponding to the type of images such as a predetermined image capturing condition, a predetermined image capturing mode, a predetermined class of subject, and a predetermined direction as a type of an image necessary for making an album. In this way, the user can show his/her personality about a composition and timing of image capturing to take an image necessary for an album without troubling over which type of image should be taken.

Figure 9:
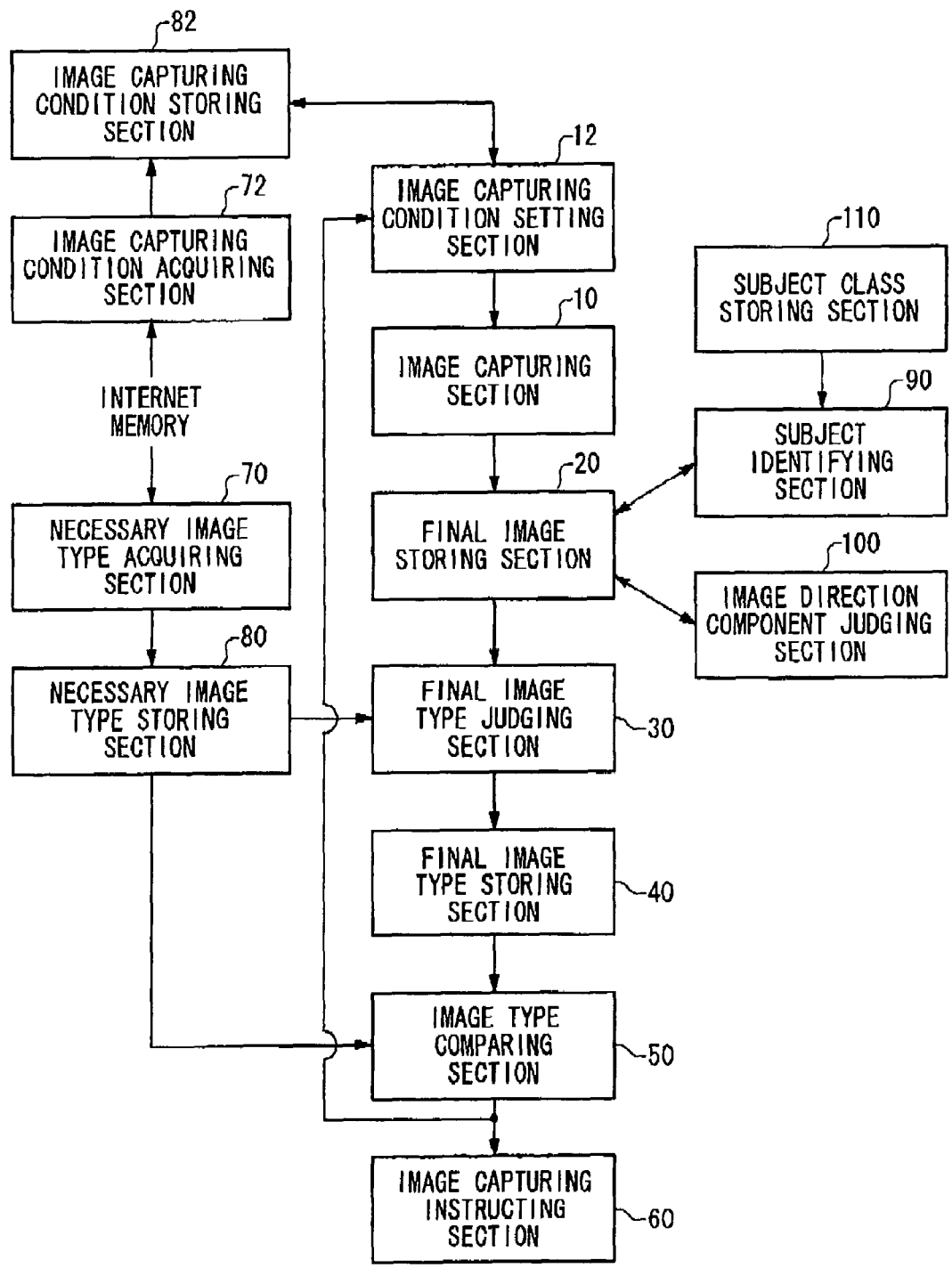
FIG. 9 is a block diagram showing a functional configuration of an image capturing apparatus.

FIG. 9 is a view exemplary showing a functional configuration of an image capturing apparatus 120 according to another embodiment of the present invention. The image capturing apparatus 120 includes an image capturing condition setting section 12, an image capturing condition acquiring section 72, and an image capturing condition storing section 82. In addition, the image capturing apparatus 120 according to the present embodiment may further include a part or the whole of the configuration and functions of the image capturing apparatus 120 described above using FIGS. 1 to 8. Here, an album template has an image arrangement frame in which an image is arranged and a character string that is arranged side-by-side in the image arrangement frame. In addition, the character string may be a character string showing contents and circumstances of the image to be arranged in the image arrangement frame, for example, may be a character string such as "!?", "Lucky!", "Boys under the sky . . . ", and "Boys, be ambitious!".

The necessary image type storing section 80 further stores a character string arranged side-by-side in an image arrangement frame in which the image is arranged, in association with a type of an image necessary for making an album. Specifically, when a user selects a desired album, the necessary image type acquiring section 70 acquires a character string to be arranged side-by-side in an image arrangement frame included in the selected album via Internet and a memory in association with the image arrangement frame. Then, the necessary image type acquiring section 70 makes the necessary image type storing section 80 store the acquired character string in association with a type of an image necessary for making an album. The necessary image type storing section 80 supplies the character string to the image capturing instructing section 60 via the image type comparing section 50.

The image capturing instructing section 60 informs the user of the character string stored on the necessary image type storing section 80 in association with the type when instructing the user to take an image of the type not yet stored on the captured image type storing section 40. Specifically, the image capturing instructing section 60 receives the character string, which is stored on the necessary image type storing section 80 in association with the type of image received from the image type comparing section 50, from the necessary image type storing section 80 via the image type comparing section 50, and informs the user of the reception. For example, the image capturing instructing section 60 informs the user of the reception by displaying the character string on a displaying section included in the image capturing apparatus 120. Moreover, the image capturing instructing section 60 may inform the user of the character string by voice. In addition, the image type comparing section 50 further supplies the type of image not yet stored on the captured image type storing section 40 to the image capturing condition setting section 12.

When the user selects a desired album, the image capturing condition acquiring section 72 acquires an image capturing condition when an image of the type of the selected album is taken via an Internet and a memory. Then, the image capturing condition acquiring section 72 makes the image capturing condition storing section 82 store the acquired image capturing condition in association with a type of an image necessary for making the album. Specifically, the image capturing condition storing section 82 stores an image capturing condition when there is taken an image of the type to be arranged every image arrangement frame included in the album, in association with the type of image. The image capturing condition may be a condition such as an image capturing mode, white balance, a diaphragm, a focal distance, and exposure time. For example, when an image to be arranged in the image arrangement frame is a "scenic" image, the image capturing condition may be an image capturing condition by a distant view mode and an image capturing condition at a predetermined focal distance. Moreover, when an image to be arranged in the image arrangement frame is "a night scene", the image capturing condition may be an image capturing condition by a night scene mode and an image capturing condition according to a predetermined exposure time. The image capturing condition storing section 82 supplies the image capturing condition to the image capturing condition setting section 12 based on the control of the image capturing condition setting section 12.

The image capturing condition setting section 12 sets the image capturing condition stored on the image capturing condition storing section 82 in association with the type of image instructed by the image capturing instructing section 60. Specifically, the image capturing condition setting section 12 acquires the image capturing condition stored on the image capturing condition storing section 82 in association with the type of image that is not yet stored on the captured image type storing section 40 and is received from the image type comparing section 50. Then, the image capturing condition setting section 12 works on the image capturing section 10 and sets the acquired image capturing condition. For example, it is considered that the type of image that is not yet stored on the captured image type storing section 40 and is received from the image type comparing section 50 is an image in which a subject with a predetermined size has been taken. In this case, the image capturing condition setting section 12 acquires the image capturing condition stored on the image capturing condition storing section 82 in association with the type of image. Then, the image capturing condition setting section 12 may work on the image capturing section 10, and make the image capturing section 10 automatically zoom the image until the size occupied by the subject included in an image capturing range exceeds a predetermined value. Moreover, for example, it is considered that the type of image that is not yet stored on the captured image type storing section 40 and is received from the image type comparing section 50 is the type of an image in which a subject located at a predetermined position has been taken. In this case, the image capturing condition setting section 12 acquires the image capturing condition stored on the image capturing condition storing section 82 in association with the type of image. Then, the image capturing condition setting section 12 may work on the image capturing section 10, and digitally pan an image capturing range automatically until the position of the subject included in the image capturing range becomes a predetermined position. Moreover, the image capturing apparatus 120 may further include an image capturing determination inputting section by which a user makes the image capturing section 10 perform an imaging operation, and the image capturing condition setting section 12 may set an image capturing condition when the instruction of an imaging operation by the user is input into the image capturing section 10 via the image capturing determination inputting section. For example, after the image capturing instructing section 60 has instructed the user to take an image of a predetermined type, the image capturing condition setting section 12 may set an image capturing condition when the user has determined to take an image of the type. For example, a release button is an example of the image capturing determination inputting section.

According to the image capturing apparatus 120 of the present embodiment, since the user can be informed of the character string displayed side-by-side in the image arrangement frame, the user can refer to the informed character string to take an image suitable for contents of the character string. Moreover, according to the image capturing apparatus 120 of the present embodiment, when taking an image of the type to be arranged in the image arrangement frame, since an image capturing condition for taking the image is automatically set, the user can omit trouble setting the image capturing condition.

Figure 10:
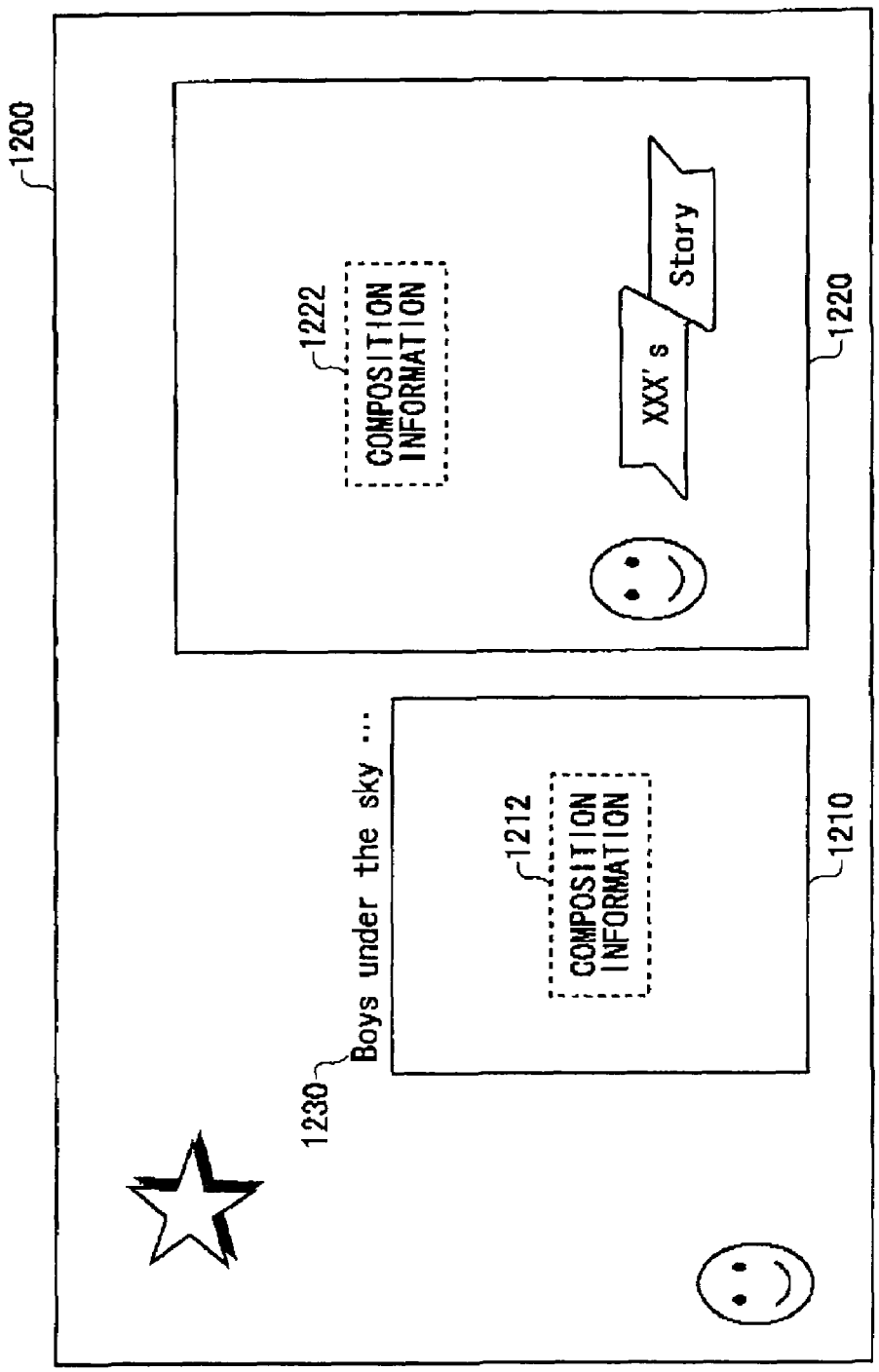
FIG. 10 is a view showing an album template.

FIG. 10 is a view exemplary showing an album template 1200 according to the present embodiment. The album template 1200 may be a template of an output area for which an image arrangement position, composition information of the image to be arranged at the image arrangement position, and an image capturing condition of the image are previously defined. In addition, the image arrangement position may correspond to the image arrangement frame in which the image should be arranged. A plurality of image arrangement positions may be included in one output area. Moreover, the image arrangement frame corresponding to the image arrangement position may be a shape such as a generally circular shape, a generally polygonal shape, and a shape of an object included in the image. Furthermore, the album template 1200 may be a template of an output area for which a first image arrangement position at which a first image should be arranged and a second image arrangement position at which a second image should be arranged are previously defined.

For example, an image arrangement frame 1210 and an image arrangement frame 1220 are included in the album template 1200. Then, composition information 1212 corresponds to the image arrangement frame 1210 and composition information 1222 corresponds to the image arrangement frame 1220. Furthermore, a character string 1230 is arranged parallel to the image arrangement frame 1210 in the album template 1200. In addition, the composition information may be information showing a special feature of the captured image to be arranged at the image arrangement position such as an object name included in the captured image, a figure name, the cast of the figure (information that the figure is a chief character in the album according to a class of an album), information showing a position of the chief character in the captured image, a birthday of the figure included in the captured image, a direction component of the captured image, and information showing an angle formed between an object included in the captured image and a normal line direction of a face on the captured image. Moreover, the album template 1200 may be a template of a page of an album. Then, a page of an album may be a cover, a back cover, a spread page, and one page of spread pages.

Then, the necessary image type acquiring section 70 acquires composition information corresponding to the image arrangement position of the album template 1200 selected by the user every image arrangement frame. In addition, composition information is an example of information indicative of a type of an image necessary for making an album. Then, the necessary image type acquiring section 70 makes the necessary image type storing section 80 store a type of an image every acquired image arrangement frame. Moreover, the image capturing condition acquiring section 72 acquires an image capturing condition corresponding to the image arrangement position of the album template 1200, and makes the image capturing condition storing section 82 store the acquired condition in association with the type of image.

Figure 11:
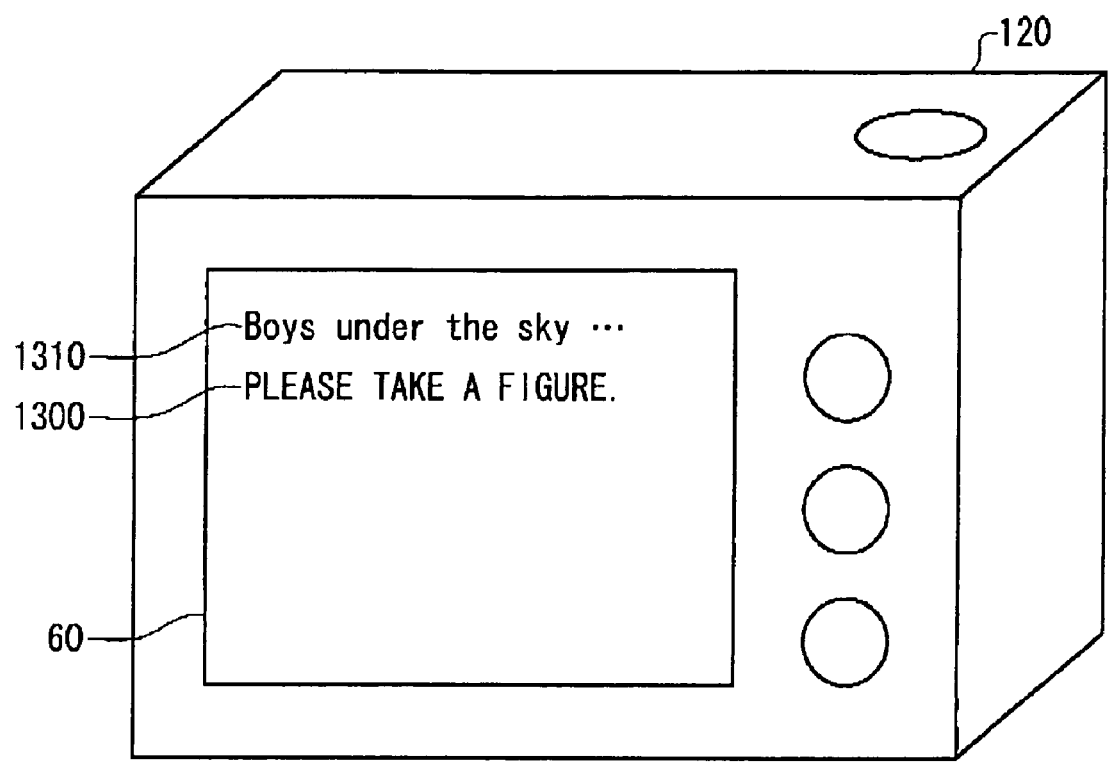
FIG. 11 is a view showing an image capturing instructing section.

FIG. 11 is a view exemplary showing the image capturing instructing section 60 according to the present embodiment. The image capturing instructing section 60 instructs the user to take an image of the type not yet stored on the captured image type storing section 40. Moreover, the image capturing instructing section 60 informs the user of the character string stored on the necessary image type storing section 80 in association with the type. For example, it is considered that an image of the type not yet stored on the captured image type storing section 40 is an image to be arranged in the image arrangement frame 1210 of the album template 1200 as described above in regard to FIG. 10. In this case, it is assumed that the composition information corresponding to the image arrangement frame 1210 is information showing that a figure is included in the image.

The image capturing instructing section 60 displays, e.g., a sentence of "Please take a figure." as an instruction 1300, in order to make the user take an image of the type to be arranged in the image arrangement frame 1210. Moreover, the image capturing instructing section 60 informs the user of a character string 1310 arranged parallel to the image arrangement frame 1210. Furthermore, the image capturing condition setting section 12 may extract the image capturing condition stored on the image capturing condition storing section 82 in association with the type of image to be arranged in the image arrangement frame 1210, in order to set an image capturing condition for the image capturing section 10. In this way, since the user can easily grasp contents of an image necessary for making an album, the user can precisely take the image necessary for making the album and control to take an image unnecessary for making the album.

Figure 12:
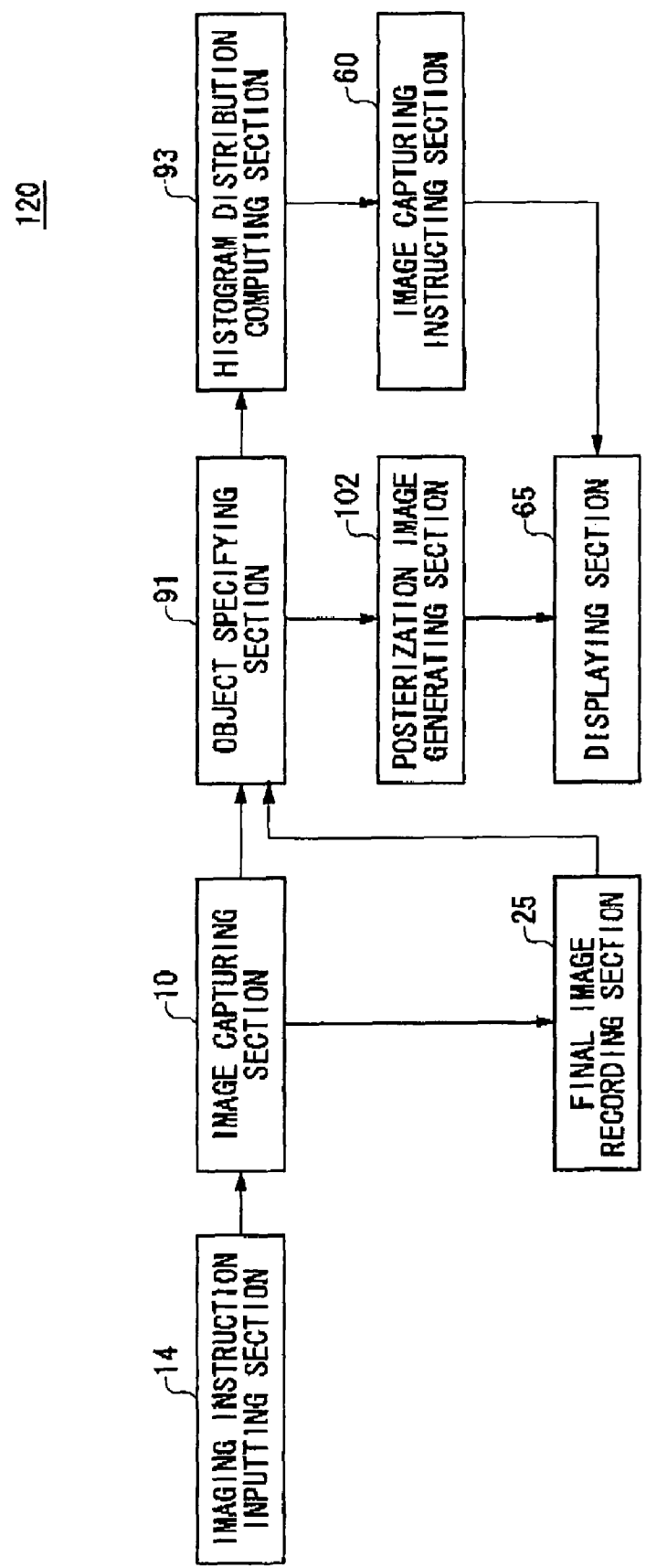
FIG. 12 is a block diagram showing a functional configuration of an image capturing apparatus.

FIG. 12 shows a functional configuration of an image capturing apparatus 120 according to another embodiment of the present invention. The image capturing apparatus 120 includes an imaging instruction inputting section 14, a captured image recording section 25, a displaying section 65, an object specifying section 91, a histogram distribution computing section 93, and a posterization image generating section 102. In addition, the image capturing apparatus 120 according to the present embodiment may further include a part or the whole of a configuration and functions of the image capturing apparatus 120 as described above in regard to FIGS. 1 to 11. An image capturing section 10 receives light of an image capturing area to acquire a captured image. The image capturing section 10 supplies the acquired captured image to the object specifying section 91. Specifically, the image capturing section 10 continuously receives light of an image capturing area to continuously acquire a captured image. Then, the image capturing section 10 continuously supplies the continuously acquired captured image to the object specifying section 91. Moreover, the image capturing section 10 supplies a captured image when an imaging instruction has been received from the imaging instruction inputting section 14 to the captured image recording section 25.

The object specifying section 91 specifies an object included in the captured image acquired from the image capturing section 10. Specifically, the object specifying section 91 may specify an object included in the captured image by edge extraction. Moreover, the object specifying section 91 may divide the captured image into a predetermined partial area and detect a spatial frequency component every partial area. Then, the object specifying section 91 may specify a partial area in which a level of a high frequency component of spatial frequency is more than a predetermined value as an area having on object. Furthermore, the object specifying section 91 may specify a face area of a figure included in the captured image by flesh color extraction. Moreover, the object specifying section 91 may receive an instruction specifying an object in an image capturing area from the user, and specify the object specified by the instruction as an object to be included in the captured image. The object specifying section 91 supplies an image of an area of the specified object to the histogram distribution computing section 93 and the posterization image generating section 102.

The histogram distribution computing section 93 computes a histogram distribution of the object area included in the captured image received from the object specifying section 91. The histogram distribution computing section 93 supplies information related to the histogram distribution of the computed object area to the image capturing instructing section 60. The posterization image generating section 102 generates a posterization image of the object from an image of the object area received from the object specifying section 91. In addition, a posterization image may be an image in which a picture element value of the captured image is limited to a discrete value, or may be an image made by binarizing the captured image of the object area or an image made by ternarizing the captured image of the object area. In addition, the posterization image generated from the posterization image generating section 102 may be an image made by posterizing the captured image until the made image is surely different from the captured image, in addition to an image made by binarizing or ternarizing the captured image of the object area. The posterization image generating section 102 supplies the generated posterization image to the displaying section 65.

The displaying section 65 displays the posterization image received from the posterization image generating section 102. For example, the displaying section 65 may be an electronic view finder. The displaying section 65 continuously displays the posterization images generated from the posterization image generating section 102. When the histogram distribution received from the histogram distribution computing section 93 is more than a predetermined range, the image capturing instructing section 60 instructs the user to take a captured image for a posterization image. For example, the image capturing instructing section 60 makes the displaying section 65 display the character string instructing the user to take a captured image for a posterization image. Moreover, the image capturing instructing section 60 may instruct the user to take a captured image for a posterization image by voice.

When the displaying section 65 is continuously displaying the posterization images, the imaging instruction inputting section 14 makes the user input an instruction of an imaging operation. Specifically, when the user who refers to the posterization images being continuously displayed on the displaying section 65 wants to acquire a desired posterization image, the imaging instruction inputting section 14 makes the user input an instruction of an imaging operation. Then, the image capturing section 10 makes the captured image recording section 25 record a captured image when receiving the instruction of the imaging operation input by the user through the imaging instruction inputting section 14. For example, a release button is an example of the imaging instruction inputting section 14.

The captured image recording section 25 receives and records the captured image, when the instruction from the user has been input into the imaging instruction inputting section 14, from the image capturing section 10. The captured image recording section 25 may supply the recorded captured image to the object specifying section 91. The object specifying section 91 may specify an object included in the captured image received from the captured image recording section 25 to supply a captured image of the object area to the posterization image generating section 102. Then, the posterization image generating section 102 generates a posterization image of the received captured image to make the displaying section 65 display the posterization image. In this way, the user can confirm whether a captured image for a desired posterization image has been taken.

In addition, in the image capturing apparatus 120 described above with reference to FIGS. 1 to 11, the necessary image type storing section 80 may store information related to a posterization image as a type of an image necessary for making an album. Moreover, the image capturing condition storing section 82 may store an image capturing condition when taking an image for a posterization image. When the user inputs the effect that the user takes a captured image for a posterization image via the imaging instruction inputting section 14, the image capturing condition setting section 12 may set an image capturing condition taking a captured image for a posterization image.

According to the image capturing apparatus 120 of the present embodiment, since it can compute a histogram distribution of an object area included in a captured image to instruct the user to take the captured image for a posterization image, the user can precisely take a captured image for a desired posterization image. Then, in the captured image for the posterization image taken by the image capturing apparatus 120, when the object is a figure, a posterization image of the figure can be arranged on a plurality of pages of an album in which the figure is a chief character, as a logo mark. In this way, the plurality of pages of the album can have feeling of unity and feeling of oneness.

FIG. 13 is a view exemplary showing a process of the histogram distribution computing section 93 and the image capturing instructing section 60 according to the present embodiment. The histogram distribution computing section 93 computes a histogram distribution of the object area specified by the object specifying section 91. For example, a histogram 316 computed from the histogram distribution computing section 93 from one image in the object area specified by the object specifying section 91 is shown on a graph 300. Moreover, a histogram 356 computed from the histogram distribution computing section 93 from another image in the object area is shown on a graph 350.

In this case, when a histogram distribution is more than a predetermined range, the image capturing instructing section 60 judges that the captured image is appropriate as a captured image for a posterization image, For example, in the graph 300, since the histogram 316 is distributed more than a picture element value range from a dotted line 312 to a dotted line 314, the image capturing instructing section 60 judges that a captured image having the histogram 316 is appropriate as a captured image for a posterization image. On the other hand, in the graph 350, it is considered that a picture element value range from a dotted line 352 to the dotted line 354 is equal to the picture element value range from the dotted line 312 to the dotted line 314 on the graph 300. In this case, in the graph 350, since a histogram 356 is not distributed more than a picture element value range from the dotted line 352 to the dotted line 354, the image capturing instructing section 60 does not judge that a captured image having the histogram 356 is appropriate as a captured image for a posterization image. In addition, a picture element value range may previously be set to a range in which a contrast of an image in an object area becomes a contrast high enough to generate a posterization image. Then, when a range of a histogram distribution received from the histogram distribution computing section 93 is more than a predetermined range, the image capturing instructing section 60 instructs the user to take a captured image for a posterization image.

Figure 14:
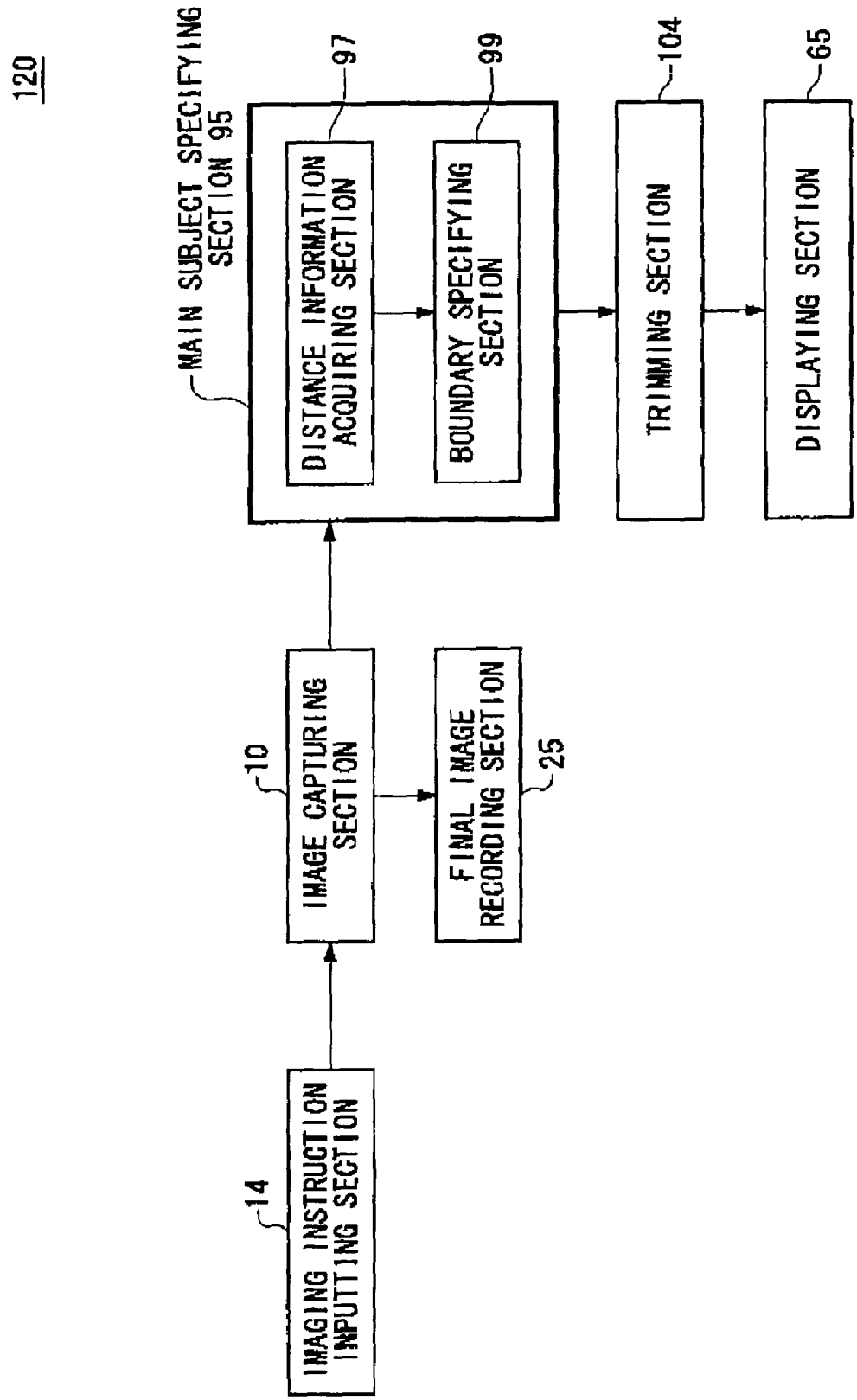
FIG. 14 is a block diagram showing a functional configuration of an image capturing apparatus.

FIG. 14 is a view exemplary showing a functional configuration of an image capturing apparatus 120 according to another embodiment of the present invention. The image capturing apparatus 120 includes a main subject specifying section 95 and a trimming section 104. In addition, the image capturing apparatus 120 according to the present embodiment may further include a part or the whole of a configuration and functions of the image capturing apparatus 120 described above with reference to FIGS. 1 to 13. Moreover, the main subject specifying section 95 has a distance information acquiring section 97 and a boundary specifying section 99. An image capturing section 10 receives light of an image capturing area to acquire a captured image. The image capturing section 10 supplies the acquired captured image to the main subject specifying section 95. Specifically, the image capturing section 10 continuously receives light of image capturing areas to continuously acquire captured images. Then, the image capturing section 10 supplies the captured images continuously acquired to the main subject specifying section 95. Moreover, the image capturing section 10 supplies a captured image, when receiving an image capturing instruction from the imaging instruction inputting section 14, to the captured image recording section 25.

The main subject specifying section 95 specifies a main subject included in the captured image received from the image capturing section 10. For example, the main subject specifying section 95 may specify, as a main subject, a subject in which a ration of an area occupied by the subject to an area of an image capturing area is more than a predetermined value, among subjects included in the image capturing area. Moreover, the main subject specifying section 95 may specify a subject located at a generally middle position in the image capturing area as a main subject. Furthermore, the main subject specifying section 95 may specify a subject focus-locked by the user as a main subject. The main subject specifying section 95 supplies a captured image to the trimming section 104 in association with a position of the specified main subject in the captured image and information related to an area occupied by the main subject in the captured image.

Moreover, the main subject specifying section 95 may have the distance information acquiring section 97 and the boundary specifying section 99. Then, the distance information acquiring section 97 acquires main subject distance information that is information showing a distance between the image capturing apparatus 120 and the main subject, for each of a plurality of partial areas in the captured image acquired from the image capturing section 10. For example, the image capturing section 10 may have a focusing section for measuring a distance between the image capturing section 10 and the subject. Then, the focusing section measures a distance between a subject of each partial area and the image capturing section 10 for each of the plurality of partial areas of the image capturing area. Then, among the distances measured by the focusing section, a distance to a subject existing at the nearest position to the image capturing section 10 may be determined as the main subject distance information. The distance information acquiring section 97 supplies the determined main subject distance information along with the captured image to the boundary specifying section 99.

Subsequently, the boundary specifying section 99 specifies a boundary of the main subject in the captured image taken by the image capturing section 10 based on the main subject distance information acquired from the distance information acquiring section 97. For example, the boundary specifying section 99 specifies an object taken in a plurality of partial areas corresponding to the same main subject distance information as the same object. Then, the boundary specifying section 99 specifies a plurality of partial areas different from the partial areas in which the same object is taken, as an area in which an object different from the specified object or a background is taken. In this way, the boundary specifying section 99 can trim off the object with high precision. In addition, the boundary specifying section 99 may trim off the object so that a partial area including an object is included. The boundary specifying section 99 supplies information related to a boundary of the main subject along with the captured image to the trimming section 104.

The trimming section 104 trims off the main subject specified by the main subject specifying section 95 from the captured image to generate a trimming image. Moreover, the trimming section 104 may trim off the main subject from the captured image by means of the boundary specified by the boundary specifying section 99. The trimming section 104 supplies the generated trimming image to the displaying section 65. The displaying section 65 may be, e.g., an electronic view finder. Then, the displaying section 65 continuously displays the trimming image generated from the trimming section 104.

When the displaying section 65 continuously displays trimming images, the imaging instruction inputting section 14 makes the user input an instruction of an imaging operation. Specifically, when the user who refers to the trimming images continuously displayed on the displaying section 65 wants to acquire a desired trimming image, the imaging instruction inputting section 14 makes the user input an instruction of an imaging operation. Then, the image capturing section 10 makes the captured image recording section 25 record a captured image when receiving the instruction of the imaging operation input by the user through the imaging instruction inputting section 14. The captured image recording section 25 receives and records the captured image when the instruction from the user has been input into the imaging instruction inputting section 14, from the image capturing section 10.

In addition, in the image capturing apparatus 120 described above with reference to FIGS. 1 to 11, the necessary image type storing section 80 may store information related to a trimming image as a type of an image necessary for making an album. Moreover, the image capturing condition storing section 82 may store an image capturing condition when taking an image for a trimming image. The image capturing condition setting section 12 may set an image capturing condition taking a captured image for a trimming image when the user inputs the effect to take the captured image for a trimming image via the imaging instruction inputting section 14.

Since the image capturing apparatus 120 according to the present embodiment can generate trimming images for the main subject to continuously display them on the displaying section 65 based on a distances between the main subject included in the captured image and the image capturing apparatus 120, the user can surely take the captured image when the main subject takes distinctive posture. In this way, a captured image including distinctive posture of a main subject can easily be taken as an image to be arranged in an image arrangement frame of an album template.

Figure 15:
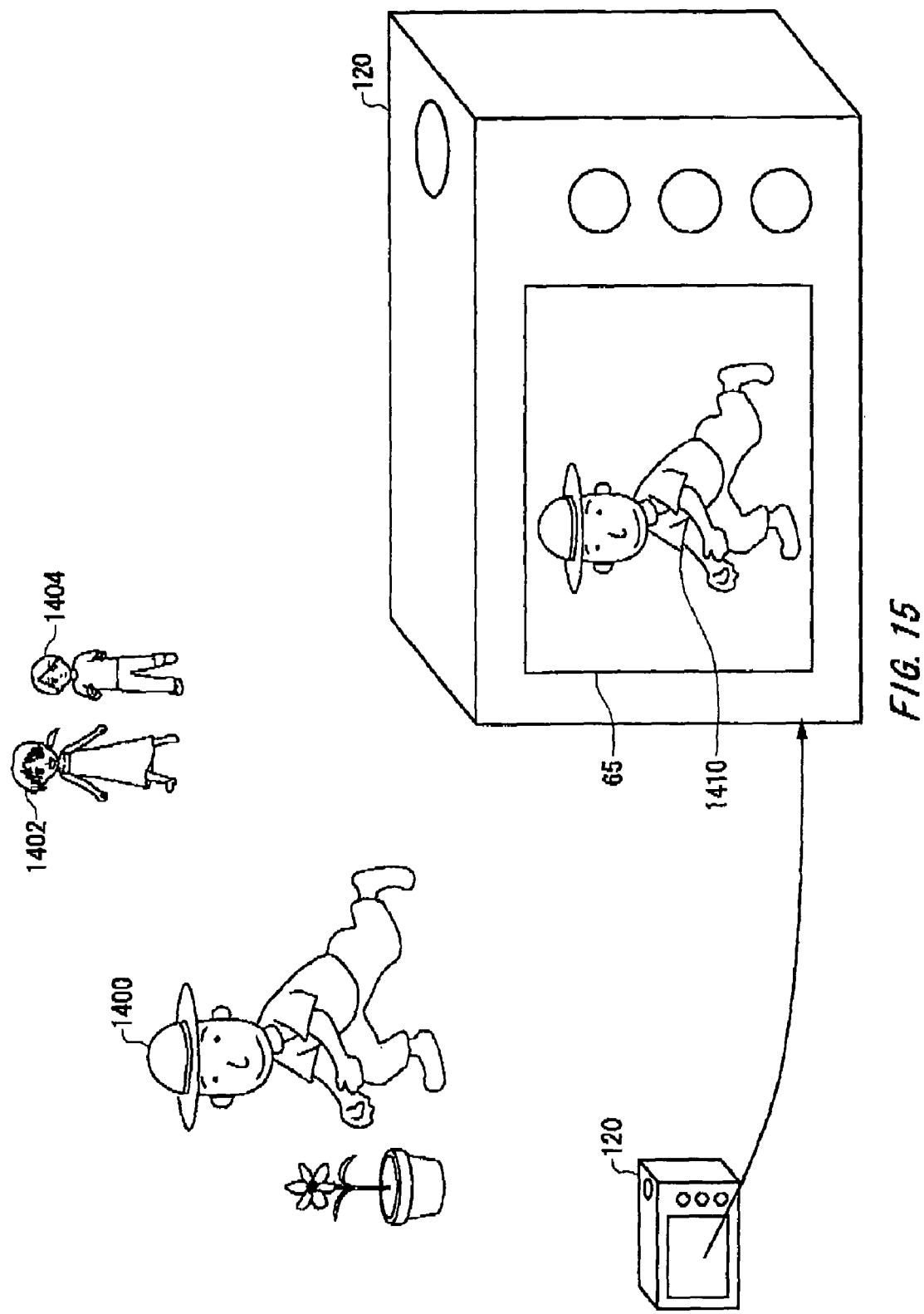
FIG. 15 is a view showing a process of a trimming section and a displaying section.

FIG. 15 is a view exemplary showing a process of the trimming section 104 and the displaying section 65 according to the present embodiment. It is considered that the image capturing section 10 is continuously acquiring captured images including a figure 1400, a figure 1402, and a figure 1404 in the same image capturing area. Then, when the main subject specifying section 95 specifies the figure 1400 as a main subject, the displaying section 65 trims off the figure 1400 that is a main subject to display only a trimming image 1410 of the figure 1400. That is, the displaying section 65 does not display the figure 1402 and the figure 1404 excepting the figure 1400 that is a main subject. In this way, because the user can precisely grasp distinctive posture of the figure 1400 that is a main subject, the user can surely take a captured image including distinctive posture of a main subject.

Figure 16:
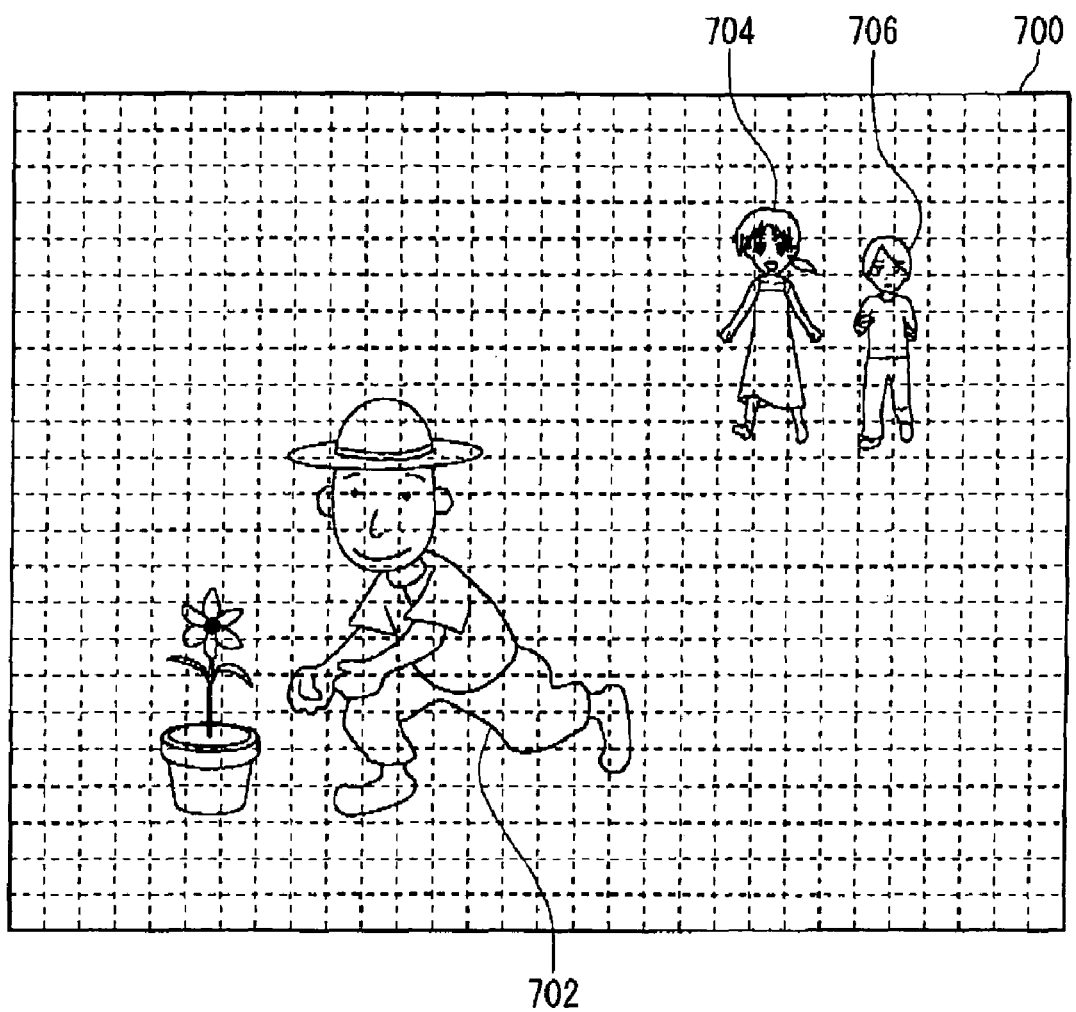
FIG. 16 is a view showing a process of a main subject specifying section.

FIG. 16 is a view exemplary showing a process of the main subject specifying section 95 according to the present embodiment. The image capturing section 10 may have a focusing section for measuring a distance between the image capturing section 10 and a subject. Then, the focusing section may divide an image capturing area 700 into a plurality of partial areas to measure a distance between the image capturing section 10 and a subject for each partial area. Then, the distance information acquiring section 97 acquires information related to the distance measured by the focusing section for each of the partial areas. The boundary specifying section 99 specifies a boundary of the main subject based on the information related to the distance of each partial area received from the distance information acquiring section 97. For example, the boundary specifying section 99 may specify an area having the shortest distance indicated by the information received from the distance information acquiring section 97 as an area occupied by the figure 702 that is a main subject. Moreover, the boundary specifying section 99 may specify a subject of which an occupied area is largest in the image capturing area 700 as the figure 702 that is a main subject. Furthermore, the boundary specifying section 99 may specify a subject located at a generally middle position in the image capturing area 700 as the figure 702 that is a main subject.

Figure 17:
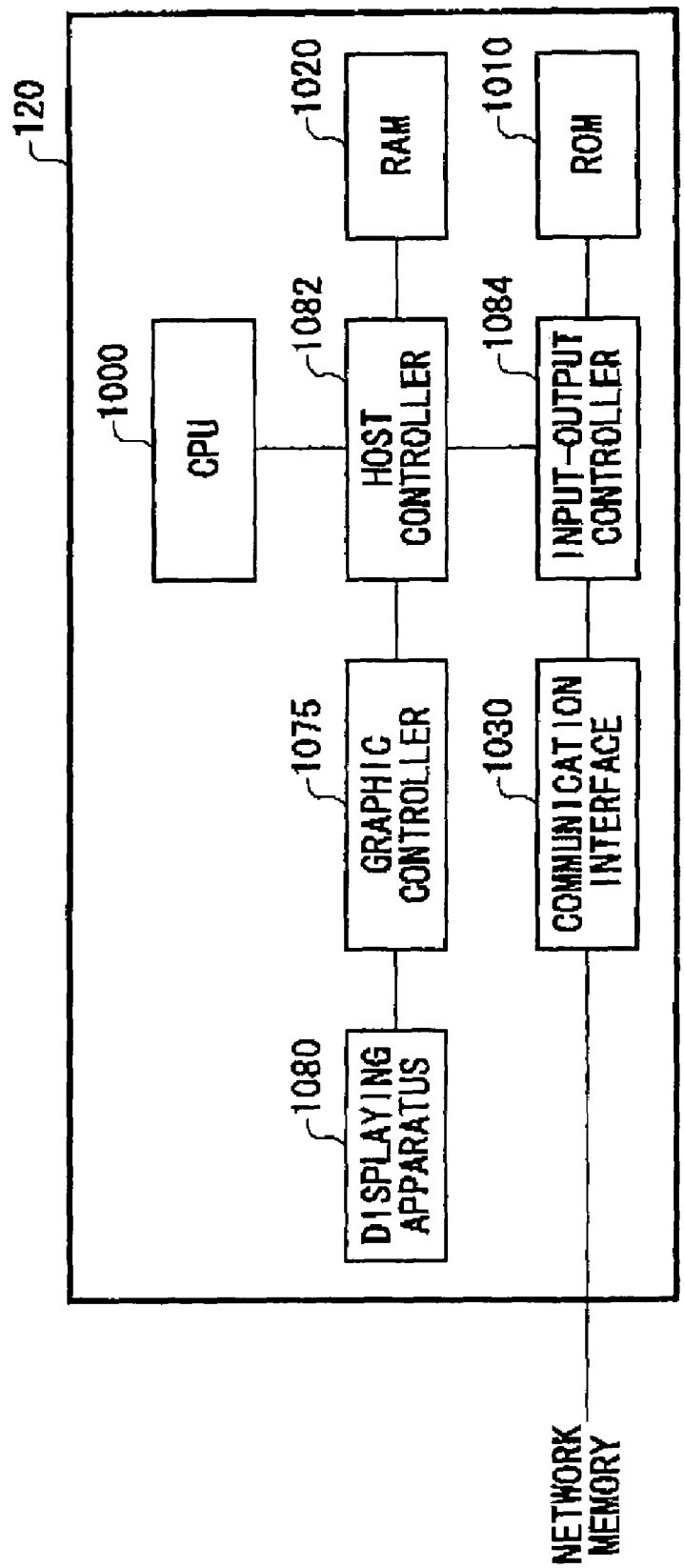
FIG. 17 is a block diagram showing a hardware configuration of an image capturing apparatus.

FIG. 17 is a view exemplary showing a hardware configuration of the image capturing apparatus 120 according to the present embodiment. The image capturing apparatus 120 includes a CPU 1000, a RAM 1020, and a graphic controller 1075 that are connected to one another by a host controller 1082, a CPU peripheral section having a displaying apparatus 1080, and an input-output section having a communication interface 1030 and a ROM 1010 that are connected to a host controller 1082 by an input-output controller 1084.

The host controller 1082 connects the CPU 1000 and the graphic controller 1075 accessing the RAM 1020 at high transfer rate to the RAM 1020. The CPU 1000 operates based on a program stored on the ROM 1010 and the RAM 1020 to control each section. The graphic controller 1075 acquires image data generated on a frame buffer provided in the RAM 1020 by the CPU 1000 or the like to display the data on the displaying apparatus 1080. Alternatively, the graphic controller 1075 may include therein a frame buffer storing the image data generated from the CPU 1000 or the like.

The input-output controller 1084 connects the communication interface 1030 that is a comparatively fast input-output apparatus to the host controller 1082. The communication interface 1030 communicates with other apparatuses via a network. Moreover, the ROM 1010 is connected to the input-output controller 1084. The ROM 1010 stores a boot program executed by the CPU 1000 during starting the image capturing apparatus 120, a program dependent on hardware of the image capturing apparatus 120, or the like.

A program provided to the image capturing apparatus 120 is installed in the image capturing apparatus 120 via a network, a memory, or the like, and is executed in the image capturing apparatus 120. The program installed in the image capturing apparatus 120 makes the image capturing apparatus 120 function as the image capturing section 10, the image capturing condition setting section 12, the imaging instruction inputting section 14, the captured image storing section 20, the captured image recording section 25, the captured image type judging section 30, the captured image type storing section 40, the image type comparing section 50, the image capturing instructing section 60, the displaying section 65, the necessary image type acquiring section 70, the image capturing condition acquiring section 72, the necessary image type storing section 80, the image capturing condition storing section 82, the subject identifying section 90, the object specifying section 91, the histogram distribution computing section 93, the main subject specifying section 95, the distance information acquiring section 97, the boundary specifying section 99, the image direction component judging section 100, the posterization image generating section 102, and the trimming section 104, which are described with reference to FIGS. 1 to 16.

The above described program may be provided from a storage device such as a hard disk or a RAM provided in a server system connected to a private communication network or an Internet to the image capturing apparatus 120 via a network, or may be stored on an outside storage medium such as a flexible disk, an optical recording medium such as CD-ROM, DVD, PD, a magneto-optical recording medium such as MD, a tape medium, or a semiconductor memory such as an IC card.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. An image capturing apparatus, comprising:
a necessary image type storing section that stores types of images necessary for making an album including a plurality of images;
a captured image storing section that stores captured images;
a captured image type judging section that judges whether an image type of a captured image stored on said captured image storing section corresponds to any of the types of necessary images stored on said necessary image type storing section;
a captured image type storing section that stores a stored image type judged by said captured image type judging section in association with the captured image stored on said captured image storing section, the stored image type being judged by said captured image type judging section that the stored image type corresponds to any of the necessary image types stored on said necessary image type storing section;
an image type comparing section that compares an image type stored on said necessary image type storing section and the stored image type already stored on said captured image type storing section to judge an image type of image that is stored on said necessary image type storing section but is not yet stored on said captured image type storing section; and
an image capturing instructing section that instructs a user in advance to capture an image of the image type not yet stored on said captured image type storing section, which is judged by said image type comparing section, before capturing an image.

2. The image capturing apparatus as claimed in claim 1, wherein
said necessary image type storing section stores information showing that an image is captured under a predetermined image capturing condition, as an image type necessary for making an album, said captured image storing section stores an image capturing condition when an image has been captured, in association with the captured image, said captured image type judging section judges whether the captured image stored on said captured image storing section is an image captured under the predetermined image capturing condition, said captured image type storing section stores information showing that an image is captured under the predetermined image capturing condition, which has been judged by said captured image type judging section, in association with the captured image stored on said captured image storing section, said image type comparing section compares the predetermined image capturing condition stored on said necessary image type storing section and the image capturing condition already stored on said captured image type storing section to judge whether an image type corresponding to an image captured under the predetermined image capturing condition is already stored on said captured image type storing section, and said image capturing instructing section instructs the user to capture an image according to the predetermined image capturing condition when the image type corresponding to an image captured under the predetermined image capturing condition is not yet stored on said captured image type storing section.

3. The image capturing apparatus as claimed in claim 2, wherein said necessary image type storing section stores information showing that an image is captured at a predetermined focusing distance, as an image type necessary for making an album, said captured image storing section stores a focusing distance when the captured image has been captured, in association with the captured image, said captured image type judging section judges whether the captured image stored on said captured image storing section is an image captured at the predetermined focusing distance, said captured image type storing section stores information showing that the captured image is captured at the predetermined focusing distance, which has been judged by said captured image type judging section, in association with the captured image stored on said captured image storing section, said image type comparing section compares the predetermined focusing distance stored on said necessary image type storing section and the focusing distance already stored on said captured image type storing section to judge whether an image type corresponding to an image captured at the predetermined focusing distance is already stored on said captured image type storing section, and said image capturing instructing section instructs the user to capture an image at the predetermined focusing distance when the image type corresponding to an image captured at the predetermined focusing distance is not yet stored on said captured image type storing section.

4. The image capturing apparatus as claimed in claim 2, wherein said necessary image type storing section stores information showing that an image is captured in a predetermined image capturing mode, as an image type necessary for making an album, said captured image storing section stores an image capturing mode when the captured image has been captured, in association with the captured image, said captured image type judging section judges whether the captured image stored on said captured image storing section is an image captured in the predetermined image capturing mode, said captured image type storing section stores information showing that the captured image is captured in the predetermined image capturing mode, which has been judged by said captured image type judging section, in association with the captured image stored on said captured image storing section, said image type comparing section compares the predetermined image capturing mode stored on said necessary image type storing section and the image capturing mode already stored on said captured image type storing section to judge whether an image type corresponding to an image captured in the predetermined image capturing mode is already stored on said captured image type storing section, and said image capturing instructing section instructs the user to capture an image in the predetermined image capturing mode when the image type corresponding to an image captured in the predetermined image capturing mode is not yet stored on said captured image type storing section.

5. The image capturing apparatus as claimed in claim 1, further comprising:

a subject identifying section that judges a class of a subject of the captured image stored on said captured image storing section, wherein said necessary image type storing section stores information showing that an image includes a subject of a predetermined class, as an image type necessary for making an album, said captured image storing section stores a subject class of the captured image judged by said subject identifying section in association with the captured image, said captured image type judging section judges whether the captured image stored on said captured image storing section is an image that includes the subject of the predetermined class, said captured image type storing section stores information showing that the captured image includes the subject of the predetermined class, which has been judged by said captured image type judging section, in association with the captured image stored on said captured image storing section, said image type comparing section compares the subject of the predetermined class stored on said necessary image type storing section and the class of a subject already stored on said captured image type storing section to judge whether an image type corresponding to an image that includes the subject of the predetermined class is already stored on said captured image type storing section, and said image capturing instructing section instructs the user to capture an image with the subject of the predetermined class when the image type corresponding to an image that includes the subject of the predetermined class is not yet stored on said captured image type storing section.

6. The image capturing apparatus as claimed in claim 1, further comprising:

a subject identifying section that judges the size of an area occupied in the image by a subject included in the image stored on said captured image storing section, wherein said necessary image type storing section stores information showing that an image includes a subject of a predetermined size, as an image type necessary for making an album, said captured image storing section stores the size of subject judged by said subject identifying section in association with the captured image, said captured image type judging section judges whether the captured image stored on said captured image storing section is an image that includes the subject of the predetermined size, said captured image type storing section stores information showing that the captured image includes the subject of the predetermined size, which has been judged by said captured image type judging section, in association with the captured image stored on said captured image storing section, said image type comparing section compares the subject having the predetermined size stored on said necessary image type storing section and the size of the subject already stored on said captured image type storing section to judge whether an image type corresponding to an image that includes the subject with the predetermined size is already stored on said captured image type storing section, and said image capturing instructing section instructs the user to capture an image with the subject of the predetermined size when the image type corresponding to an image that includes the subject with the predetermined size is not yet stored on said captured image type storing section.

7. The image capturing apparatus as claimed in claim 1, further comprising:

a subject identifying section that judges a position in an image of a subject included in the image stored on said captured image storing section, wherein said necessary image type storing section stores information showing that a subject of an image is captured at a predetermined position within the image, as an image type necessary for making an album, said captured image storing section stores the position of a subject in the captured image judged by said subject identifying section in association with the captured image, said captured image type judging section judges whether the captured image stored on said captured image storing section is an image in which the subject is captured at the predetermined position within the image, said captured image type storing section stores information showing that the subject of the captured image is captured at the predetermined position within the image, which has been judged by said captured image type judging section, in association with the captured image stored on said captured image storing section, said image type comparing section compares the subject at the predetermined position in the image stored on said necessary image type storing section and the position of the subject in the captured image already stored on said captured image type storing section to judge whether an image type corresponding to an image in which the subject is located at the predetermined position within the image is already stored on said captured image type storing section, and said image capturing instructing section instructs the user to capture an image in which the subject is located at the predetermined position within the image when the image type corresponding to an image in which the subject has been captured at the predetermined position is not yet stored on said captured image type storing section.

8. The image capturing apparatus as claimed in claim 1, wherein said necessary image type storing section stores information showing that an image has a predetermined direction, as an image type necessary for making an album, said captured image storing section stores a direction of the captured image in association with the captured image, said captured image type judging section judges whether the captured image stored on said captured image storing section has the predetermined direction, said captured image type storing section stores information showing that the captured image is an image having the predetermined direction, which has been judged by said captured image type judging section, in association with the captured image stored on said captured image storing section, said image type comparing section compares the predetermined direction stored on said necessary image type storing section and the direction of the captured image already stored on said captured image type storing section to judge whether an image type corresponding to an image having the predetermined direction is already stored on said captured image type storing section, and said image capturing instructing section instructs the user to capture an image having the predetermined direction when the image type corresponding to an image having the predetermined direction is not yet stored on said captured image type storing section.

9. The image capturing apparatus as claimed in claim 1, further comprising:

an image direction component judging section that judges a direction component of the captured image stored on said captured image storing section, wherein said necessary image type storing section stores information showing that an image includes a predetermined direction component, as an image type necessary for making an album, said captured image storing section stores a direction component of the captured image judged by said image direction component judging section in association with the captured image, said captured image type judging section judges whether the captured image stored on said captured image storing section with includes the predetermined direction component, said captured image type storing section stores information showing that the captured image includes the predetermined direction component, which has been judged by said captured image type judging section, in association with the captured image stored on said captured image storing section, said image type comparing section compares the predetermined direction component stored on said necessary image type storing section and the direction component of the captured image already stored on said captured image type storing section to judge whether an image type corresponding to an image with the predetermined direction component is already stored on said captured image type storing section, and said image capturing instructing section instructs the user to capture an image with the predetermined direction component when the image type corresponding to an image with the predetermined direction component is not yet stored on said captured image type storing section.

10. The image capturing apparatus as claimed in claim 9, wherein said necessary image type storing section stores information showing that a direction to a vanishing point of an object included in an image is a predetermined direction, as an image type necessary for making an album, said image direction component judging section judges a direction to a vanishing point of an object included in the captured image stored on said captured image storing section, said captured image storing section stores the direction to the vanishing point judged by said image direction component judging section in association with the captured image, said captured image type judging section judges whether the direction to the vanishing point of the object included in the captured image stored on said captured image storing section is the predetermined direction, said captured image type storing section stores information showing that the direction to the vanishing point of the object judged by said captured image type judging section in association with the captured image stored on said captured image storing section is the predetermined direction, said image type comparing section compares the predetermined direction stored on said necessary image type storing section and the direction to the vanishing point of the object included in the captured image already stored on said captured image type storing section to judge whether an image type corresponding to an image in which the direction to the vanishing point of the object is the predetermined direction is already stored on said captured image type storing section, and said image capturing instructing section instructs the user to capture an image in which the direction to the vanishing point of the object is the predetermined direction when the image type corresponding to an image with the predetermined direction to the vanishing point of the object is not yet stored on said captured image type storing section.

11. The image capturing apparatus as claimed in claim 1, wherein an album template comprises an image arrangement frame in which an image is arranged and a character string is arranged side-by-side in the image arrangement frame, said necessary image type storing section stores a character string arranged side-by-side in the image arrangement frame in which the captured image is arranged, in association with an image type necessary for making an album, and said image capturing instructing section informs the user of the character string stored on said necessary image type storing section in association with the image type when instructing the user to capture an image of the image type not yet stored on said captured image type storing section.

12. The image capturing apparatus as claimed in claim 1, further comprising:

an image capturing condition storing section that stores an image capturing condition when an image corresponding to any of the types of necessary images stored on said necessary image type storing section is captured, in association with an image type necessary for making an album; and an image capturing condition setting section that sets the image capturing condition stored on said image capturing condition storing section in association with the image type instructed by said image capturing instructing section when said image capturing instructing section instructs the user to capture an image.

13. An image capturing method, comprising:

a necessary image type storing step of storing types of images necessary for making an album including a plurality of images;

a captured image storing step of storing captured images;

a captured image type judging step of judging whether a type of the captured image stored in said captured image storing step corresponds to any of the types of necessary images stored in said necessary image type storing step;

a captured image type storing step of storing an image type judged in said captured image type judging step in association with the captured image stored in said captured image storing step, the image type being judged in said captured image type judging step that the image type corresponds to any of the necessary image types stored in said necessary image type storing step;

an image type comparing step of comparing the types of images stored in said necessary image type storing step and the image type already stored in said captured image type storing step to judge a type of image that is stored in said necessary image type storing step but is not yet stored in said captured image type storing step; and an image capturing instructing step of instructing a user in advance to capture an image of the type not yet stored in said captured image type storing step, which is judged in said image type comparing step, before capturing an image.

14. A computer readable medium encoded with instructions, wherein the instructions when executed by an image capturing apparatus that instructs a user in advance to capture an image before taking capturing the image cause the image capturing apparatus to function as:

a necessary image type storing section that stores types of images necessary for making an album including a plurality of images;

a captured image storing section that stores captured images;

a captured image type judging section that judges whether an image type of a captured image stored on said captured image storing section corresponds to any of the types of necessary images stored on said necessary image type storing section;

a captured image type storing section that stores a stored image type judged by said captured image type judging section in association with the captured image stored on said captured image storing section, the stored image type being judged by said captured image type judging section that the stored image type corresponds to any of the necessary image types stored on said necessary image type storing section;

an image type comparing section that compares an image type stored on said necessary image type storing section and the stored image type already stored on said captured image type storing section to judge a type of image that is stored on said necessary image type storing section but is not yet stored on said captured image type storing section; and an image capturing instructing section that instructs a user in advance to capture an image of the type not yet stored on said captured image type storing section, which is judged by said image type comparing section, before the capturing an image.

* * * * *